United States Patent
Matsui et al.

(10) Patent No.: US 9,508,979 B2
(45) Date of Patent: *Nov. 29, 2016

(54) BATTERY, NEGATIVE ELECTRODE FOR BATTERY, BATTERY PACK, ELECTRONIC APPARATUS, ELECTRIC VEHICLE, ELECTRICITY STORAGE APPARATUS AND ELECTRIC POWER SYSTEM

(71) Applicant: Sony Corporation, Tokyo (JP)

(72) Inventors: Takaaki Matsui, Fukushima (JP); Aya Mashiko, Fukushima (JP); Tadashi Matsushita, Fukushima (JP); Takehiko Ishii, Fukushima (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/729,457

(22) Filed: Jun. 3, 2015

(65) Prior Publication Data

US 2015/0270531 A1    Sep. 24, 2015

Related U.S. Application Data

(63) Continuation of application No. 13/850,901, filed on Mar. 26, 2013, now Pat. No. 9,054,364.

(30) Foreign Application Priority Data

Mar. 30, 2012 (JP) ................................. 2012-082195

(51) Int. Cl.
*H01M 4/133* (2010.01)
*H01M 4/64* (2006.01)
(Continued)

(52) U.S. Cl.
CPC ............ *H01M 4/02* (2013.01); *B60L 11/1879* (2013.01); *H01M 4/133* (2013.01); *H01M 4/583* (2013.01);
(Continued)

(58) Field of Classification Search
CPC ................ H01M 2004/027; H01M 2004/021; H01M 4/583; H01M 4/133; H01M 4/64; H01M 4/02
See application file for complete search history.

(56) References Cited

U.S. PATENT DOCUMENTS 9,054,364 B2 * 6/2015 Matsui .................. H01M 4/133
2007/0178376 A1 8/2007 Fujikawa et al.
2007/0190423 A1 8/2007 Ishii et al.

FOREIGN PATENT DOCUMENTS

CN    1906780 A    1/2007
JP    08-180869    7/1996
(Continued)

OTHER PUBLICATIONS

Notification of the First Office Action (Chinese application No. 2013100952607), The State Intellectual Property Office of the People's Republic of China, Notification date:Jan. 19, 2016.
Japanese Office Action for Japanese Application No. 2012-082195 issued Aug. 10, 2015.

*Primary Examiner* — Stewart Fraser
(74) *Attorney, Agent, or Firm* — Chip Law Group

(57) ABSTRACT

A battery comprising a positive electrode; a negative electrode including a negative electrode active material layer that is formed on at least one surface of a negative electrode collector; and an electrolyte, wherein in the negative electrode active material layer from the negative electrode collector up to ½ of a layer thickness in a surface direction of the negative electrode active material layer, a pore volume ratio expressed as (pore volume B/pore volume A) that is a ratio of a pore volume A (ml/g) in a range of 0.001 μm or more and 0.4 μm or less of a pore diameter measured by a mercury porosimeter and a pore volume B (ml/g) in a range of 0.4 μm or more and 10 μm or less of the pore diameter is 1.4 or more and 3.4 or less.

17 Claims, 13 Drawing Sheets

(51) Int. Cl.
  *H01M 4/02* (2006.01)
  *H01M 4/70* (2006.01)
  *H01M 10/44* (2006.01)
  *B60L 11/18* (2006.01)
  *H01M 4/583* (2010.01)
  *H01M 4/62* (2006.01)

(52) U.S. Cl.
  CPC ............... *H01M 4/622* (2013.01); *H01M 4/64* (2013.01); *H01M 4/70* (2013.01); *H01M 10/44* (2013.01); *H01M 2004/021* (2013.01); *H01M 2004/027* (2013.01); *H01M 2220/30* (2013.01); *Y02E 60/122* (2013.01)

(56) References Cited

FOREIGN PATENT DOCUMENTS

| | | |
|---|---|---|
| JP | 11-263612 A | 9/1999 |
| JP | 2003-068301 | 3/2003 |
| JP | 2003-197182 A | 7/2003 |
| JP | WO2005/069410 A1 | 7/2005 |
| JP | 2006-286427 | 10/2006 |
| JP | 2007-273192 A | 10/2007 |
| JP | 2009-238584 | 10/2009 |
| JP | 2009-238584 A | 10/2009 |

\* cited by examiner

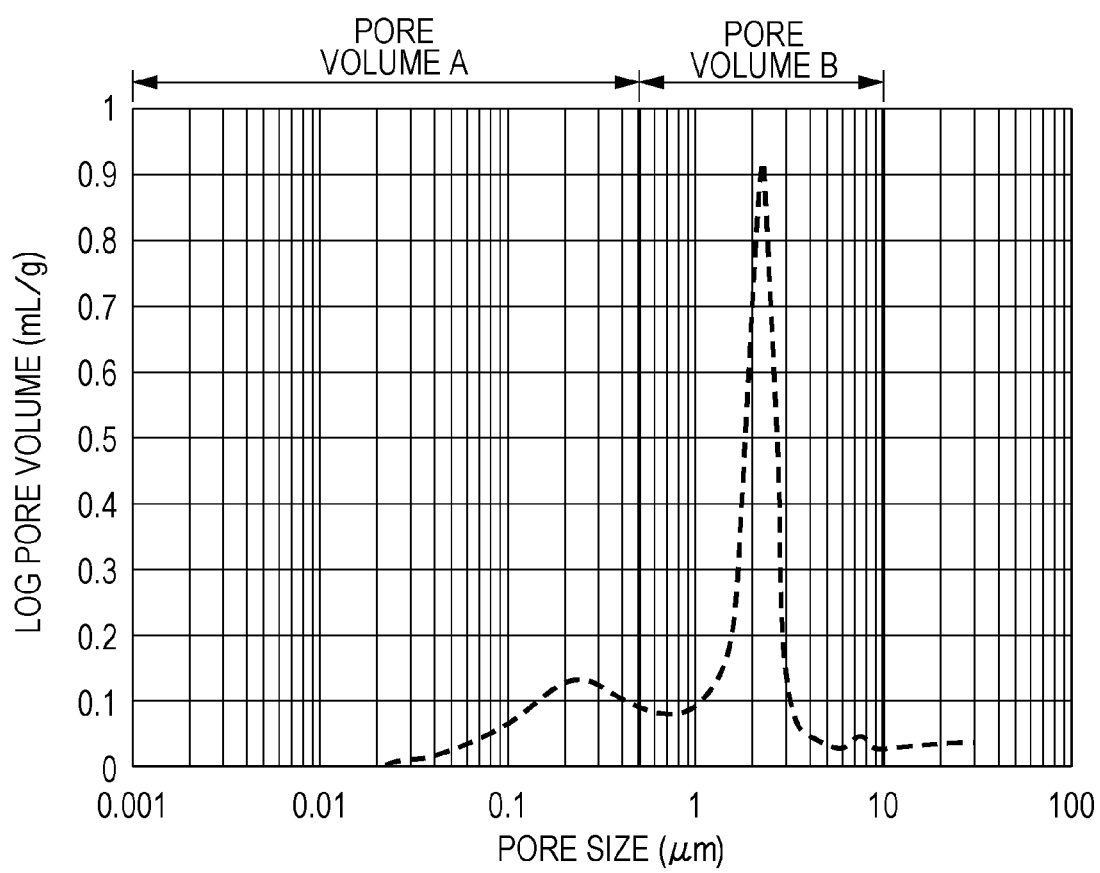

FIG. 13A
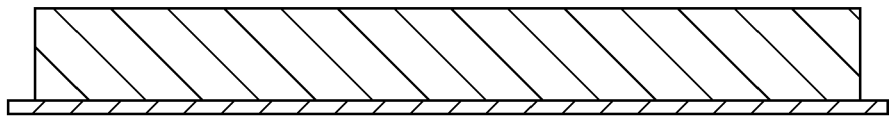
FIG. 13B

BATTERY, NEGATIVE ELECTRODE FOR BATTERY, BATTERY PACK, ELECTRONIC APPARATUS, ELECTRIC VEHICLE, ELECTRICITY STORAGE APPARATUS AND ELECTRIC POWER SYSTEM

CROSS REFERENCES TO RELATED APPLICATIONS

The present application is a continuation of U.S. patent application Ser. No. 13/850,901 filed on Mar. 26, 2013, which claims priority to Japanese Priority Patent Application JP 2012-082195 filed in the Japan Patent Office on Mar. 30, 2012, the entire content of which is hereby incorporated by reference.

BACKGROUND

The present disclosure relates to a battery and a negative electrode for battery. In addition, the present disclosure relates to a battery pack using a battery, an electronic apparatus, an electric vehicle, an electricity storage apparatus, and an electric power system.

In recent years, with the spread of portable electronic information apparatuses such as mobile phones, video cameras, laptop personal computers, and the like, high performance, miniaturization, and reduction in weight of these apparatuses have been achieved. As a power source of the apparatus, a disposable primary battery or a reusable secondary battery is used, but demand for a nonaqueous electrolyte battery, particularly, a lithium ion secondary battery has increased because of its good overall balance of performance, size, weight, cost, and the like. In addition, as further high-performance, miniaturization, or the like of such an apparatus is progressively achieved, new high-energy density is desired even with respect to the nonaqueous electrolyte battery such as the lithium ion secondary battery.

In the secondary battery represented by the lithium ion secondary battery, a graphite material is widely used as a negative electrode active material, and because of demands for high capacity, among the graphite materials natural graphite having a large theoretical capacity or artificial graphite having the same form as the natural graphite may be used.

In Japanese Unexamined Patent Application Publication No. 8-180869, upon using fibrous carbon as the negative electrode active material, there is described a method of using an electrode for solving defects of structural anisotropy being strong due to the significantly high orientation, and a capacity does not increase due to different likelihood of intercalation depending on the direction. Specifically, a method in which a carbonaceous material having an average length not more than 5 mm that is obtainable from a carbon body having the orientation P of $70\% \leq P \leq 85\%$ and a crystallite thickness Lc by X-ray diffraction of 13 Å$\leq$Lc$\leq$20 Å may be used to provide a secondary battery electrode is described. Thus, a secondary battery having a high capacity may be realized.

In Japanese Unexamined Patent Application Publication No. 2006-286427, there is described an electrode plate for nonaqueous electrolyte secondary battery that includes two or more electrode active material layers and one or more conductive layers in at least one surface of a collector, and has a laminated structure capable of charging and discharging which is constructed by alternately laminating the electrode active material layer and the conductive layer. In the electrode plate for the nonaqueous electrolyte secondary battery, each conductive layer is an ion permeable porous matter with voids, and is directly conducted with or indirectly conducted with the collector via the other conductive layer. Accordingly, the amount of active material per unit area of the electrode may be increased without decreasing output characteristics, and a weight energy density and a volume energy density of the electrode plate may be improved. Therefore, it is possible to reduce the number of collector and separator, thereby reducing material costs.

In Japanese Unexamined Patent Application Publication No. 2003-68301, there is described a method of using a negative electrode that includes a negative electrode mixture layer containing graphite particles whose average roundness is at least 0.93 as a negative electrode active material and the other graphite particles in order to solve a problem that load characteristics of the battery is deteriorated when using scale-like graphite particles. There is described a method of providing the nonaqueous electrolyte secondary battery having excellent load characteristics in which an orientation degree of the graphite particles by X-ray diffraction of the negative electrode mixture layer is at least 0.001.

In addition, in Japanese Unexamined Patent Application Publication No. 2009-238584, there is described a negative electrode using carbon particles having a roundness of a particle cross section of 0.6 to 0.9, an interlayer distance d (002) of graphite crystal found by X-ray diffraction measurement of 3.38 Å or less, and a crystallite size Lc (002) in a C-axis direction of 500 Å or more. In Japanese Unexamined Patent Application Publication No. 2009-238584, there is described a method of using, in the negative electrode, carbon particles in which a peak intensity ratio of a carbon 002 face and a carbon 110 face measured by the X-ray diffraction is 600 or less to thereby obtain a battery of high capacity and excellent cycle characteristics.

SUMMARY

However, in the negative electrode in the related art, in addition to a problem that scale-like natural graphite would be easily oriented in the longitudinal direction of an electrode, stability of a negative electrode to change over time in a cycle is still insufficient, and therefore it is necessary to realize a long life of the electrode. In particular, when a thickness of a negative electrode active material layer is thicker than that in the related art in order to achieve a high-capacity of the electrode, cycle characteristics may be more significantly deteriorated. With respect to these problems, in the technologies disclosed in the above-described Patent Documents, stability still remains insufficient.

According to an embodiment of the present disclosure, there is provided a battery including: a positive electrode; a negative electrode in which a negative electrode active material layer containing a negative electrode active material containing natural graphite is formed on at least one surface of a negative electrode collector; and an electrolyte, wherein a thickness of the negative electrode active material layer per one surface of the negative electrode collector is 50 µm or more and 100 µm or less, and in the negative electrode active material layer from the negative electrode collector up to ½ of the thickness of the negative electrode active material layer in a surface direction of the negative electrode active material layer, an orientation degree A expressed as (peak intensity of carbon 002 face/peak intensity of carbon 110 face) that is a peak intensity ratio of a carbon 002 face and a carbon 110 face measured by an X-ray diffraction method is 100 or more and 500 or less.

According to another embodiment of the present disclosure, there is provided a negative electrode for a battery, wherein a negative electrode active material layer containing a negative electrode active material containing natural graphite is formed on at least one surface of a negative electrode collector, a thickness of the negative electrode active material layer per one surface of the negative electrode collector is 50 μm or more and 100 μm or less, and in the negative electrode active material layer from the negative electrode collector up to ½ of the thickness of the negative electrode active material layer in a surface direction of the negative electrode active material layer, an orientation degree A expressed as (peak intensity of carbon 002 face/peak intensity of carbon 110 face) that is a peak intensity ratio of a carbon 002 face and a carbon 110 face measured by an X-ray diffraction method is 100 or more and 500 or less.

According to still another embodiment of the present disclosure, there are provided a battery pack, an electronic apparatus, an electric vehicle, an electricity storage apparatus, and an electric power system which include the above-described battery.

In the present disclosure, in the negative electrode in which the thickness of the negative electrode active material layer per one surface of the negative electrode collector is 50 μm or more and 100 μm or less, an orientation degree of a carbon material containing natural graphite in the negative electrode active material layer from the negative electrode collector up to ½ of the thickness of the negative electrode active material layer in the surface direction of the negative active material layer may be used as a predetermined value. Thus, it is possible to ensure conductivity in the inner negative electrode active material layer whose battery reactivity is easily deteriorated.

According to the present disclosure, it is possible to obtain a battery having high cycle characteristics and a negative electrode for battery having high stability to change over time in a cycle. In addition, it is possible to obtain a battery pack, an electronic apparatus, an electric vehicle, an electricity storage apparatus, and an electric power system which have a battery including high cycle characteristics.

Additional features and advantages are described herein, and will be apparent from the following Detailed Description and the figures.

BRIEF DESCRIPTION OF THE FIGURES

FIG. 3 is a graph showing a pore volume with respect to a pore diameter obtained by measuring a negative electrode active material layer of a negative electrode by a mercury porosimeter according to a second embodiment of the preset disclosure;

FIGS. 13A and 13B are explanatory views showing an XRD measurement method of a negative electrode active material layer according to an embodiment of the present disclosure.

DETAILED DESCRIPTION

Figure 1:
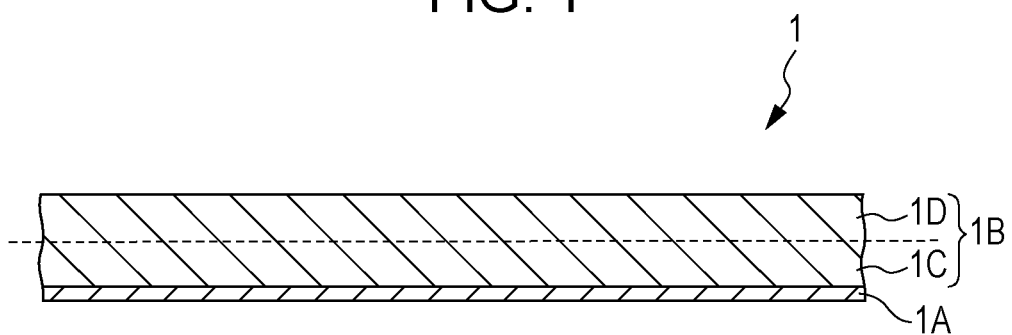
FIG. 1 is a cross-sectional view showing a first configuration example of a negative electrode according to a first embodiment of the present disclosure.

Hereinafter, preferred embodiments (hereinafter, referred to as "embodiment") of the present disclosure will be described. In addition, description will be made as below.
1. First embodiment (example of negative electrode of the present disclosure)
2. Second embodiment (example of cylindrical battery using negative electrode of the present disclosure
3. Third embodiment (example of thin battery using negative electrode of the present disclosure
4. Fourth embodiment (example of coin-type battery using negative electrode of the present disclosure
5. Fifth embodiment (example of battery pack using battery of the present disclosure)
6. Sixth embodiment (example of electricity storage system or the like using battery of the present disclosure)

1. First Embodiment

In a first embodiment, a negative electrode for battery of the present disclosure will be described.
(1-1) Configuration of Negative Electrode for Battery
A negative electrode 1 that is a negative electrode for battery of the present disclosure has a structure in which a negative electrode active material layer 1B is provided on one surface or both surfaces of a negative electrode collector 1A having a pair of surfaces facing each other. The negative electrode collector 1A is made of a metal foil such as copper (Cu) foil or the like. The negative electrode 1 may be connected to the negative electrode collector 1A.

The negative electrode active material layer 1B may be configured to include one or two kinds or more of negative electrode materials capable of intercalating and deintercalating lithium as a negative electrode active material, and the negative electrode active material of the present disclosure primarily contains natural graphite.

The negative electrode active material layer 1B may be configured to contain, for example, a negative electrode active material and a binder, and a conductive material as necessary. As the binder, a resin material such as polyvinylidene fluoride (PVdF), polytetrafluoroethylene (PTFE), polyacrylonitrile (PAN), styrene-butadiene rubber (SBR), carboxymethylcellulose (CMC), or the like, and at least one kind selected from copolymers consisting primarily of these resin materials may be used. As the conductive material, for example, carbon materials such as carbon black or fibrous carbon may be used.

Examples of the negative electrode material capable of being usable together with natural graphite as the negative electrode active material, and capable of intercalating and deintercalating lithium include carbon materials such as hardly graphitized carbon, easily graphitized carbon, graphite, pyrolytic carbons, cokes, vitreous carbons, organic polymer compound calcined materials, carbon fibers, and active carbon. Of these, examples of the cokes include pitch coke, needle coke, and petroleum coke. The organic polymer compound calcined material as referred to herein is a material obtained through carbonization by calcining a polymer material such as phenol resins and furan resins at an appropriate temperature, and a part thereof is classified into hardly graphitized carbon or easily graphitized carbon. Such a carbon material is preferable because a change in the crystal structure to be generated at the time of charge and discharge is very small, a high charge and discharge capacity is obtainable, and satisfactory cycle characteristics are obtainable. Also, hardly graphitized carbon is preferable because excellent cycle characteristics are obtainable. Moreover, a material having a low charge and discharge potential, specifically one having a charge and discharge potential close to a lithium metal, is preferable because a high energy density of the battery can be easily realized.

Examples of the negative electrode material capable of intercalating and deintercalating lithium and capable of being usable together with natural graphite also include a material capable of intercalating and deintercalating lithium and containing, as a constituent element, at least one member selected from the group consisting of metal elements and semi-metal elements. This is because by using such a material, a high energy density is obtainable. In particular, the joint use of such a material with the natural graphite is more preferable because not only a high energy density is obtainable, but excellent cycle characteristics are obtainable. This negative electrode material may be a simple substance, an alloy, or a compound of a metal element or a semi-metal element. Also, the negative electrode material may be an electrode material having one or two or more kinds of such a phase in at least a part thereof. In addition, in the present disclosure, the alloy includes alloys containing at least one metal element and at least one semi-metal element in addition to alloys composed of two or more metal elements. Also, the negative electrode material may contain a non-metal element. Examples of its texture include a solid solution, an eutectic (eutectic mixture), an intermetallic compound, and one in which two or more thereof coexist.

Examples of the metal element or semi-metal element which constitutes this negative electrode material include, for example, magnesium (Mg), boron (B), aluminum (Al), titan (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These may be crystalline or amorphous.

Of these, ones containing, as a constituent element, a metal element or a semi-metal element belonging to the Group 4B in the short form of the periodic table are preferable, and ones containing, as a constituent element, at least one of silicon (Si) and tin (Sn) are especially preferable as this negative electrode material. This is because silicon (Si) and tin (Sn) have large capability of intercalating and deintercalating lithium, and a high energy density is obtainable. As the negative electrode material having at least one of silicon (Si) and tin (Sn), for example, a single body, an alloy, and a compound of silicon, a single body, an alloy, and a compound of tin (Sn), or a material having at least a part of one or two phases or more thereof may be given.

Examples of alloys of tin (Sn) include alloys containing, as a second constituent element other than tin (Sn), at least one member selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of alloys of silicon (Si) include alloys containing, as a second constituent element other than silicon (Si), at least one member selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of compounds of tin (Sn) or compounds of silicon (Si) include compounds containing oxygen (O) or carbon (C), and these compounds may contain the foregoing second constituent element in addition to tin (Sn) or silicon (Si).

Of these, SnCoC-containing materials containing tin (Sn), cobalt (Co), and carbon (C) as constituent elements and having a content of carbon of 9.9% by mass or more and not more than 29.7% by mass and a proportion of cobalt (Co) of 30% by mass or more and not more than 70% by mass relative to the total sum of tin (Sn) and cobalt (Co) are preferable as this negative electrode material. This is because in the foregoing composition range, not only a high energy density is obtainable, but excellent cycle characteristics are obtainable.

This SnCoC-containing material may further contain other constituent element, if desired. As such other constituent element, for example, silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga), or bismuth (Bi) is preferable, and two or more kinds of these elements may be contained. This is because the capacity or cycle characteristics can be enhanced further.

In addition, this SnCoC-containing material has a phase containing tin (Sn), cobalt (Co), and carbon (C), and it is preferable that this phase has a low crystalline or amorphous structure. Also, in this SnCoC-containing material, it is preferable that at least a part of the metal element or semi-metal element that is the constituent element be bound to carbon (C) that is the other constituent element. This is because though it may be considered that a lowering of the cycle characteristics is caused due to aggregation or crystallization of tin (Sn) or the like, when carbon (C) is bound to other element, such aggregation or crystallization can be suppressed.

Examples of a measurement method for examining the binding state of elements include X-ray photoelectron spectroscopy (XPS). In the XPS, so far as graphite is concerned, a peak of the 1s orbit (C1s) of carbon appears at 284.5 eV in an energy-calibrated apparatus such that a peak of the 4f orbit of a gold (Au) atom (Au4f) is obtained at 84.0 eV. Also, so far as surface contamination carbon is concerned, a peak of the 1s orbit (C1s) of carbon appears at 284.8 eV. On the contrary, in the case where a charge density of the carbon element is high, for example, when carbon is bound to a metal element or a semi-metal element, the peak of C1s appears in a lower region than 284.5 eV. That is, when a peak of a combined wave of C1s obtained regarding the SnCoC-containing material appears in a lower region than 284.5 eV, at least a part of carbon contained in the SnCoC-containing material is bound to a metal element or a semi-metal element as other constituent element.

In addition, in the XPS measurement, for example, the peak of C1s is used for correcting the energy axis of a spectrum. In general, since surface contamination carbon exists on the surface, the peak of C1s of the surface contamination carbon is fixed at 284.8 eV, and this peak is used as an energy reference. In the XPS measurement, since a waveform of the peak of C1s is obtained as a form including the peak of the surface contamination carbon and the peak of carbon in the SnCoC-containing material, the peak of the surface contamination carbon and the peak of the carbon in the SnCoC-containing material are separated from each other by means of analysis using, for example, a commercially available software program. In the analysis of the waveform, the position of a main peak existing on the lowest binding energy side is used as an energy reference (284.8 eV).

Examples of the negative electrode capable of intercalating and deintercalating lithium may include other metal compounds or polymer materials. Examples of the other metal compounds may include oxides such as lithium titanate ($Li_4Ti_5O_{12}$), manganese dioxide ($MnO_2$), or vanadium oxide ($V_2O_5$, $V_6O_{13}$), sulfides such as nickel sulfide (NiS) or molybdenum disulfide ($MoS_2$), or lithium nitride such as lithium nitride ($Li_3N$). Examples of the polymer materials may include polyacetylene, polyaniline, or polypyrrole.

In the present disclosure, with respect to the negative electrode active material layer 1B formed on the negative electrode collector 1A shown in FIG. 1, a thickness of the negative electrode active material layer 1B may be in a range of 50 μm or more to 100 μm or less. Thus, it is possible to increase a battery capacity and improve a volume ratio of the negative electrode active material layer 1B in the battery, and thereby improve volume efficiency.

In addition, in FIG. 1, an example of the negative electrode 1 in which the negative electrode active material layer 1B is formed only on one surface of the negative electrode collector 1A is shown, but a configuration of the present disclosure is not limited thereto. The configuration of the present disclosure may include the negative electrode 1 in which the negative electrode active material layer 1B is formed on both surfaces of the negative electrode collector 1A. In this case, the above-described thickness range may be applied to a thickness of the negative electrode active material layer 1B formed on one surface of the negative electrode collector 1A.

In this instance, in the negative electrode active material layer (appropriately referred to as "inner layer 1C") from the negative electrode collector 1A up to ½ of the thickness of the negative electrode active material layer 1B in a surface direction of the negative electrode active material layer 1B, a carbon material containing natural graphite that is the negative electrode material should not be excessively oriented to the longitudinal direction of the negative electrode. This is to prevent deterioration in conductivity in the inner layer 1C in contact with the negative electrode collector 1A in order to prevent conductivity between the negative electrode collector 1A and the negative electrode active material layer 1B. The carbon material is not excessively oriented to the longitudinal direction of the negative electrode, and therefore an edge surface of the carbon material is easily oriented in a direction of the negative electrode collector 1A and in a direction of a positive electrode (not shown) provided so as to face the negative electrode 1. As a result, intercalation/deintercalation of lithium ion from the edge surface are smoothly performed, a reduction in capacity maintenance factor of the battery may be suppressed. In addition, the carbon material such as natural graphite is appropriately oriented, and therefore lithium diffusion is suitably made in the negative electrode active material layer 1B after receiving lithium ion from the positive electrode by the negative electrode 22.

Specifically, in the inner layer 1C, an orientation degree A expressed as a ratio (peak intensity of carbon 002 face/peak intensity of carbon 110 face) of a peak intensity of a carbon 002 face (face perpendicular to the graphite layer) to a peak intensity of a carbon 110 face (face horizontally to a graphite layer spread in a planar shape by forming a network structure by carbon atoms) which is measured by an X-ray diffraction (XRD) method may be 100 or more and 500 or less.

In addition, the above-described orientation degree A may be obtained from the peak intensity of the carbon 110 face and the peak intensity of the carbon 002 face measured by the following measurement conditions in an X-ray diffraction device.

[Measurement Conditions]
Target: Cu
X-ray output: 40 kV, 100 mA
Measurement range: $2\theta=20°$ to $80°$
Step angle: $0.02°$
Counting time per one step: 3.0 seconds Since a sloop of the orientation degree A of the carbon material containing natural graphite in a thickness direction of the negative electrode 1 is small when the orientation degree A other than the above-described range is small, lithium diffusion becomes slow in the negative electrode active material layer 1B after receiving the lithium ion from the positive electrode by the negative electrode 22, and therefore a lifespan of cycle characteristics may be reduced. The lithium ion is moved in the direction (in the thickness direction of the negative electrode active material layer 1B) of the negative electrode collector 1A after receiving the lithium ion on a surface of the negative electrode 1, but when the orientation degree A is less than 1.5, there is no difference in the orientation degree in the inner layer 1C of the negative electrode active material layer 1B from the surface of the negative electrode 1, and diffusion of lithium ion is not smoothly performed.

Meanwhile, when the orientation degree A other than the above-described range is large, a diffusion distance of lithium from the positive electrode increases along with an increase in the orientation degree A in the inner layer 12C of the negative electrode active material layer 1B, thereby deteriorating cycle characteristics.

Furthermore, in addition to the above-described configuration, in the entire negative electrode active material layer 1B, it is preferable that an orientation degree B expressed as a ratio (peak intensity of carbon 002 face/peak intensity of carbon 110 face) of a peak intensity of a carbon 002 face to a peak intensity of a carbon 110 face which is measured by the X-ray diffraction method be 150 or more and 1,000 or less.

Figure 2A:
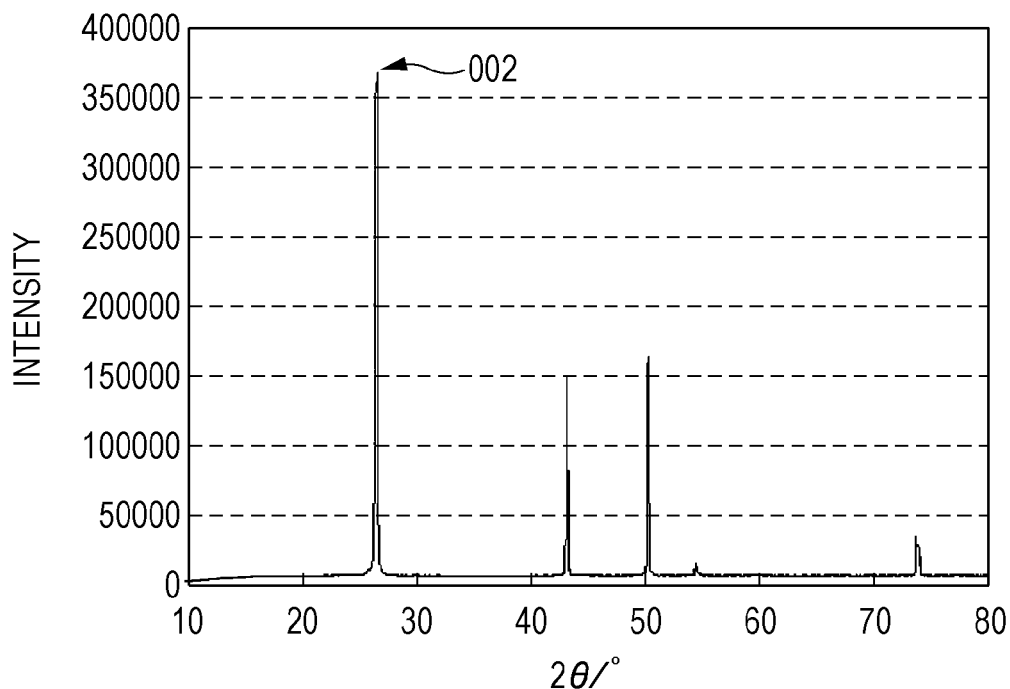
FIGS. 2A and 2B are graphs showing a measurement result of X-ray diffraction of a negative electrode active material layer of a negative electrode according to a first embodiment of the present disclosure.
Figure 2B:
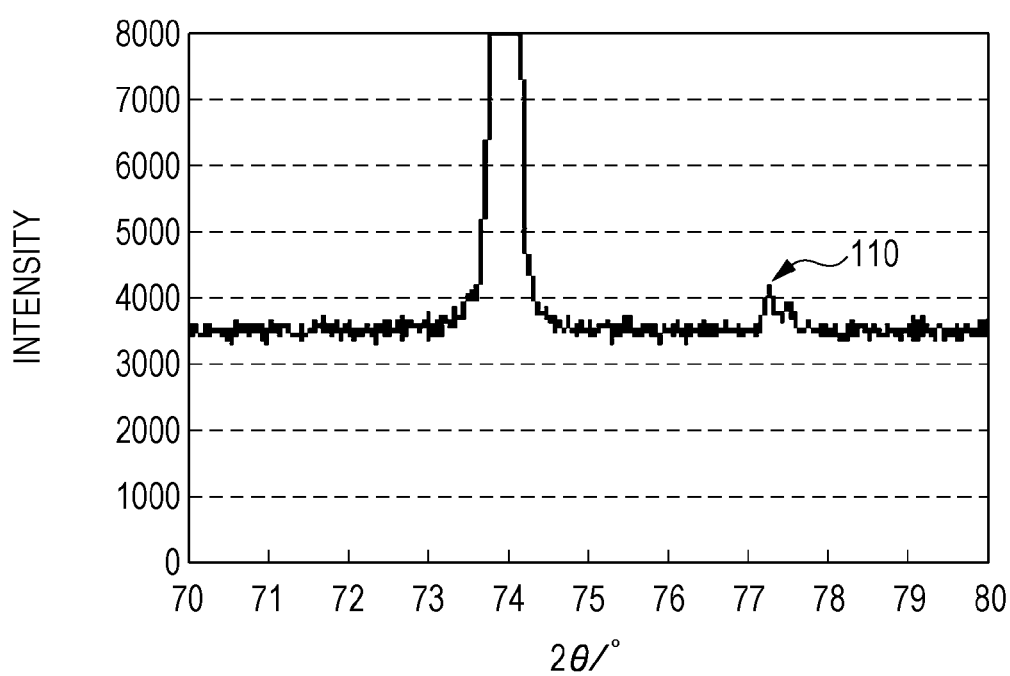

In addition, it is assumed that the above-described orientation degree B is obtained from the peak intensity of the carbon 110 face and the peak intensity of the carbon 002 face which are measured by the same measurement conditions as the orientation degree A. In addition, FIGS. 2A and 2B are graphs showing an example of XRD measurement results of the negative electrode active material layer 1B of the present disclosure. FIG. 2A is a drawing showing the measurement result in the above-described measurement range, and FIG. 2B is an enlarged view of the measurement result of a range of 2θ=70° to 80° of the above-described measurement range. As the XRD measurement result of the negative electrode active material layer 1B shown in the graphs of FIGS. 2A and 2B, the peak intensity of the carbon 002 face is 360000, the peak intensity of the carbon 110 face is 4000, and a background is 3500. Accordingly, (the peak intensity of the carbon 002 face)/(the peak intensity of the carbon 110 face) obtained by removing the background is (360000−3500)/(4000−3500)=713, and the orientation degree A is calculated as 713.

The orientation degree B is greater than the orientation degree A. This means that the negative electrode active material layer 1B includes the inner layer 1C and a surface layer 1D in a state of being more collapsed than the inner layer 1C, and the orientation degree B of the entire negative electrode active material layer 1B is higher than the orientation degree A of the inner layer 1C. By setting the orientation degree B within the above-described range, a slope is formed at the orientation degree in the surface layer 12D and the inner layer 12C of the negative electrode 1, the lithium ion received on the surface of the negative electrode 1 is easily diffused by the inner layer 1C of the negative electrode active material layer 1B from the surface of the negative electrode 1.

In addition, it is preferable that a ratio (orientation degree B/orientation degree A) of the orientation degree B to the orientation degree A be 1.5 or more and 2.0 or less. The orientation degree ratio of the inner layer 1C and the surface layer 1D of the negative electrode active material layer 1B is appropriately adjusted, and therefore the lithium ion within the negative electrode active material layer 1B may be more appropriately diffused.

Furthermore, in the inner layer 1C, it is preferable that a pore volume ratio that is a ratio (pore volume B/pore volume A) of a pore volume A[ml/g] in a range of 0.001 μm or more and 0.4 μm or less of a pore diameter obtainable when measuring the inner layer 1C by a mercury porosimeter and a pore volume B [ml/g] in a range of 0.4 μm or more and 10 μm or less thereof be 1.4 or more and 3.4 or less. FIG. 3 is a graph showing a pore volume with respect to a pore diameter of the negative electrode active material layer 1B, measured by the mercury porosimeter. Here, the pore volume A is a volume of a pore mainly in a carbon material such as natural graphite or the like, and the pore volume B is a volume of a void formed between mainly the carbon material and a binder.

When the pore volume B is too large, the void between the negative electrode active materials or the like within the negative electrode active layer 1B is large, and a conductive path containing particles of the negative electrode active material is significantly reduced, and therefore cycle performance may be significantly deteriorated.

In the present disclosure, it is preferable that the balance between the pore volume A being mainly composed of a volume of the pore in the carbon material such as natural graphite or the like, and the pore volume B being mainly composed of a volume of the void formed between the carbon materials or the like be appropriately adjusted. When the above-described pore volume ratio is in the above-described range, compared to a case in which the pore volume B/pore volume A is in a range exceeding 3.4, the void in the negative electrode active material layer 1B is reduced and the conductive path containing the particles is significantly improved, and therefore the cycle characteristics may be significantly improved. Meanwhile, when the above-described pore volume ratio is in the above-described range, compared to a case in which the pore volume B/pore volume A is in a range less than 1.4, deterioration of ion diffusion caused by physical cracking of the particles of the carbon material that is the negative electrode active material or void too small hardly occurs, and therefore deterioration of the cycle characteristics accompanying this may be significantly suppressed.

In addition, the above-described pore volume ratio (pore volume B/pore volume A) increases along with a reduction in a volume density of the negative electrode active material layer 1B, and decreases along with an increase in the volume density of the negative electrode active material layer 1B. On the other hand, by adjustment of a press condition or the like when forming the negative electrode active material layer 1B which will be described below, only the pore volume ratio may be intentionally changed while the volume density of the negative electrode active material layer 1B is made the same.

Furthermore, it is preferable that the volume density of the negative electrode active material layer 1B be 1.40 g/cm$^3$ or more and 1.65 g/cm$^3$ or less. When the volume density is small, outside the above-described range, a volume energy density is reduced while the orientation degree A and the orientation degree B depart from a preferred range. In addition, when the volume density is large, outside the above-described range, a collapse property of the negative electrode active material layer 1B is large, and the cycle characteristics are deteriorated.

In addition, the volume density of the negative electrode active material layer 1B and the orientation degrees A and B have correlation. That is, the negative electrode active material layer 1B is in a state of being collapsed along with an increase in the volume density, and therefore the orientation degrees A and B tend to be easily increased. However, by the adjustment of the press condition when forming the negative electrode active material layer 1B or by selecting a method of dividing the negative electrode active material layer 1B into a plurality of layers, it is possible to form the negative electrode active material layer 1B having different orientation degrees A and B despite having the same volume density.

1-2 Fabricating Method of Negative Electrode for Battery
[Fabricating Method of Negative Electrode]

A negative electrode mixture is adjusted by mixing a negative electrode mixture and a binder, and a paste-like negative electrode mixture slurry is fabricated by dispersing the negative electrode mixture in a solvent such as N-methyl-2-pyrrolidone or the like. Next, by applying the negative electrode mixture slurry onto the negative electrode collector 1A by a doctor blade or a bar coater, the solvent is dried, and the negative electrode active material layer 1B is formed by performing compression molding by a roll press machine or the like, thereby fabricating the negative electrode 1.

In this instance, the negative electrode active material layer 1B may be formed so as to have at least the above-described thickness and the orientation A. In addition, it is preferable that the negative electrode active material layer 1B be fabricated so as to have the orientation degree B, the orientation degree ratio (orientation degree B/orientation degree A), and the pore volume ratio (pore volume B/pore volume A). Specifically, by adjusting the press condition at the time of forming the negative electrode active material layer 1B as below, the orientation degree, the pore volume, and the like may be changed.

At the time of pressing, accordingly as a pressing speed is slowed, a degree of collapse of the surface layer 1D of the negative electrode active material layer 1B is smaller, and therefore it is possible to control the orientation degree B of the entire negative electrode active material layer 1B to be low. Meanwhile, the orientation degree A in the inner layer 1C of the negative electrode active material layer 1B may be controlled to be small as the pressing speed is slowed in the same manner as the surface layer 1D, but a reduction ratio of the orientation degree A of the surface layer 1D of the negative electrode active material layer 1B may be greater. Therefore, compared to a reduction of the orientation degree B of the entire negative electrode active material layer 1B, it is possible to control a reduction of the orientation degree A in the inner layer 1C of the negative electrode active material layer 1B to be smaller.

In the same manner, as the pressing pressure is made smaller, it is possible to control the orientation degree B of the negative electrode active material layer 1B to be small. In addition, a reduction ratio of the orientation degree A of the surface layer 1D of the negative electrode active material layer 1B is greater than a reduction ratio of the orientation degree A in the inner layer 1C of the negative electrode active material layer 1B. Therefore, compared to a reduction of the orientation degree B of the entire negative electrode active material layer 1B, it is possible to control the reduction of the orientation degree A in the inner layer 1C of the negative electrode active material layer 1B to be smaller.

In addition, the pressing may be performed by a method such as passing between a pair of rollers, the negative electrode collector 1A where a coating film of the negative electrode mixture slurry is formed, but a gap between the rollers may be changed by a thickness of the coating film of the negative electrode mixture slurry, and therefore influence on the orientation degree is small. However, when the gap between the rollers is significantly small with respect to the thickness of the coating film of the negative electrode mixture slurry, the orientation degree B of the surface layer 1D of the negative electrode active material layer 1B formed by the pressing is large, and particularly, a degree of collapse of the outermost surface portion may be increased.

In addition, a multi-stage press that performs a pressing operation multiple times instead of once may be performed. When performing the multi-stage press, at most five times may be most preferable. When the number of times of pressing is at most five, it is possible to appropriately control a ratio of the orientation degree A of the inner layer 1C of the negative electrode active material layer 1B and the orientation degree B of the entire negative electrode active material layer 1B without causing cracking or the like of natural graphite. Specifically, by increasing the number of times of pressing within the above-described number of times of pressing, that is, when the number of times of pressing is five or close to five, it is possible to reduce a difference of the orientation degree of the carbon material in each of the inner layer 1C of the negative electrode active material layer 1B and the entire negative electrode active material layer 1B. Meanwhile, when the number of times of pressing exceeds five, cycle characteristics are deteriorated by cracking of the natural graphite of the surface of the negative electrode active material layer 1B.

In addition, by the method in which the negative electrode active material layer 1B is formed by repeating the applying, drying, and compression process of the negative electrode mixture slurry a plurality of times, the orientation degree between the inner layer 1C and the surface layer 1D, the pore volume, and the like may be changed. In this case, when forming the negative electrode active material layer 1B by repeating the process a plurality of times, adjustment of the press conditions may be jointly performed.

2. Second Embodiment

In a second embodiment of the present disclosure, a cylindrical battery using the negative electrode according to the first embodiment will be described.

2-1 Configuration of Cylindrical Battery
[Structure of Cylindrical Battery]

Figure 4:
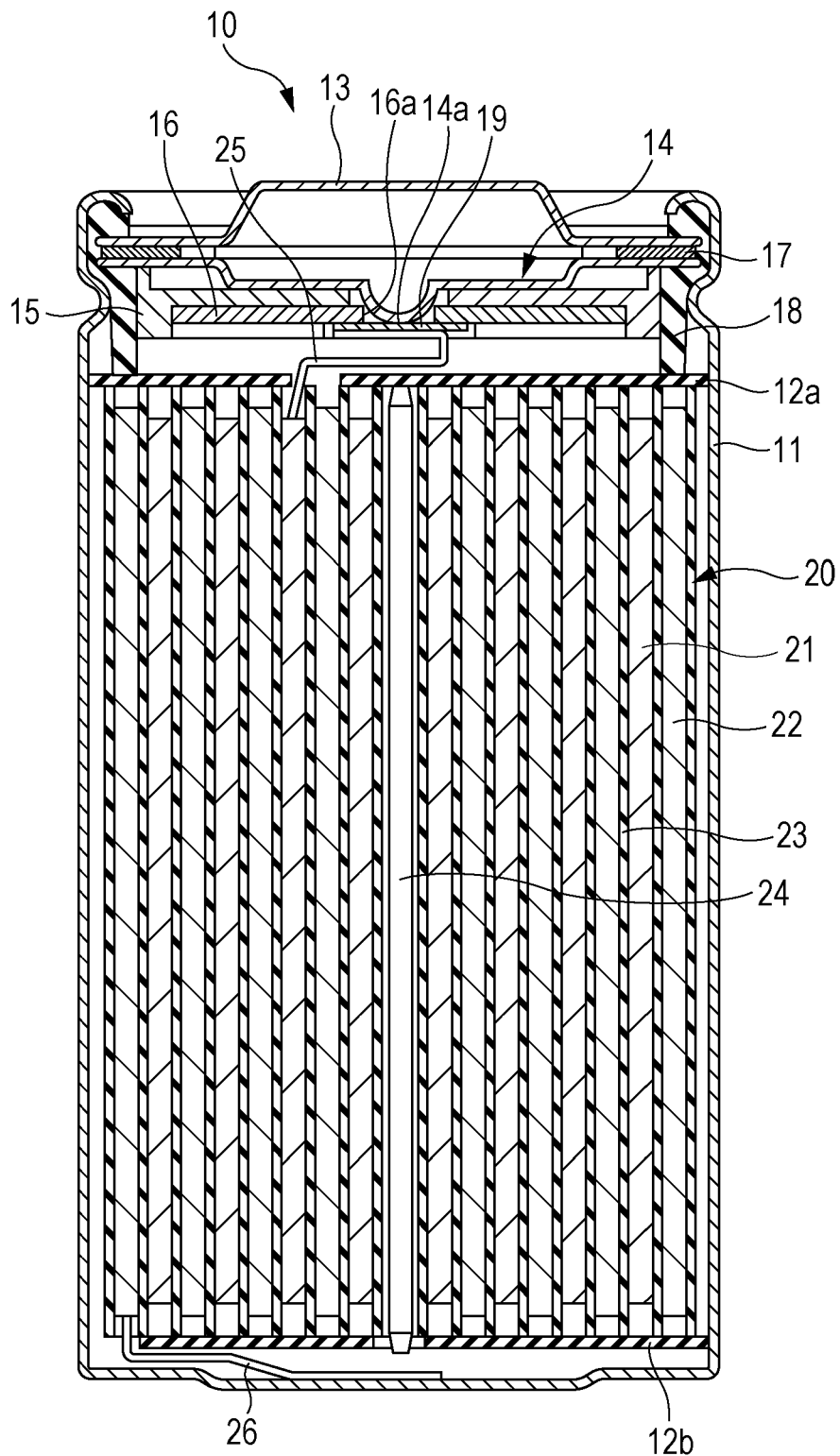
FIG. 4 is a cross-sectional view showing a first configuration example of a cylindrical battery according to a second embodiment of the present disclosure.

FIG. 4 is a cross-sectional view showing an example of a configuration of a cylindrical battery 10 according to a second embodiment. The cylindrical battery 10 is a lithium ion secondary battery capable of charging and discharging. The cylindrical battery 10 includes a wound electrode body 20 in which a belt shape positive electrode 21 and a negative electrode 22 together with liquid electrolyte (hereinafter, appropriately referred to as electrolytic solution) not shown are wound around through a separator 23 of the present disclosure inside a substantially hollow columnar battery can 11.

The battery can 11 is, for example, constituted of nickel-plated iron, and one end thereof is closed, with the other end being opened. In the inside of the battery can 11, a pair of insulating plates 12a and 12b is respectively disposed vertical to the winding peripheral face so as to interpose the wound electrode body 20 therebetween.

Examples of the material of the battery can 11 may include iron (Fe), nickel (Ni), stainless (SUS), aluminum (Al), titanium (Ti), or the like. In order to prevent corrosion by electrochemical electrolyte accompanying charging and discharging of the cylindrical battery 10, plating of, for example, nickel coating may be performed on the battery can 11. In the open end of the battery can 11, a battery lid 13 that is a positive electrode lead plate, a safety valve mechanism provided in the inside of the battery lid 13, and a heat sensitive resistance element (PTC element: positive temperature coefficient element) 17 are attached by being caulked via a gasket 18 for sealing insulation.

The battery lid 13 is, for example, constituted of the same material as that in the battery can 11, and an opening for discharging gas generated in the inside of the battery is provided. In the safety valve mechanism, a safety valve 14, a desk holder 15, and a cutoff desk 16 are sequentially laminated. A protrusion portion 14a of the safety value 14 is connected with a positive electrode lead 25 led out from the wound electrode body 20 via a sub desk 19 which is disposed so as to cover a hole 16a provided in the center portion of the cutoff desk 16. The safety valve 14 and the positive electrode lead 25 are connected with each other via the sub desk 19, and therefore the positive electrode lead 25 may be prevented from being drawn from the hole 16a when the safety valve 14 is reversed. In addition, the safety valve mechanism is electrically connected to the battery lid 13 via the heat sensitive resistance element 17.

In the safety valve mechanism, when the internal pressure of the cylindrical battery 10 reaches a fixed value or more due to an internal short circuit of the battery, heating from the outside of the battery, or the like, the safety valve 14 is reversed, whereby electrical connection between the protrusion portion 14a, the battery lid 13, and the wound electrode body 20 may be disconnected. That is, when the safety valve 14 is reversed, the positive electrode lead 25 may be pushed by the cutoff desk 16, and therefore connection the safety valve 14 and the positive electrode lead 25 may be disconnected. The desk holder 15 is made of an insulating material, and the safety valve 14 and the cutoff desk 16 are insulated when the safety valve 14 is reversed.

In addition, when the internal pressure of the battery is further increased due to gas further generated inside the battery, a part of the safety valve 14 is ruptured to thereby enable the gas to be discharged to the battery lid 13.

In addition, for example, a plurality of degassing holes (not shown) are provided in the periphery of the hole 16a of the cutoff desk 16, and therefore, when gas is generated from the wound electrode body 20, the gas may be effectively discharged to the battery lid 13.

A resistance value of the heat sensitive resistance element 17 increases when a temperature rises, and a current is interrupted by disconnecting electrical connection between the battery lid 13 and the wound electrode body 20, thereby preventing abnormal heating that occurs due to an excessive current. The gasket 18 is, for example, made of an insulating material, and asphalt is applied on a surface of the gasket 18.

The wound electrode body 20 housed in the cylindrical battery 10 is wound around the center pin 24. In the wound electrode body 20, the positive electrode 21 and the negative electrode 22 are sequentially laminated via a separator 23, and the wound electrode body 20 is wound in a longitudinal direction. A positive electrode lead 25 is connected to the positive electrode 21, and a negative electrode lead 26 is connected to the negative electrode 22. As described above, the positive electrode lead 25 is welded to the safety valve 14 so as to be electrically connected with the battery lid 13, and the negative electrode lead 26 is welded to the battery can 11 so as to be electrically connected to the battery can 11.

Figure 5:
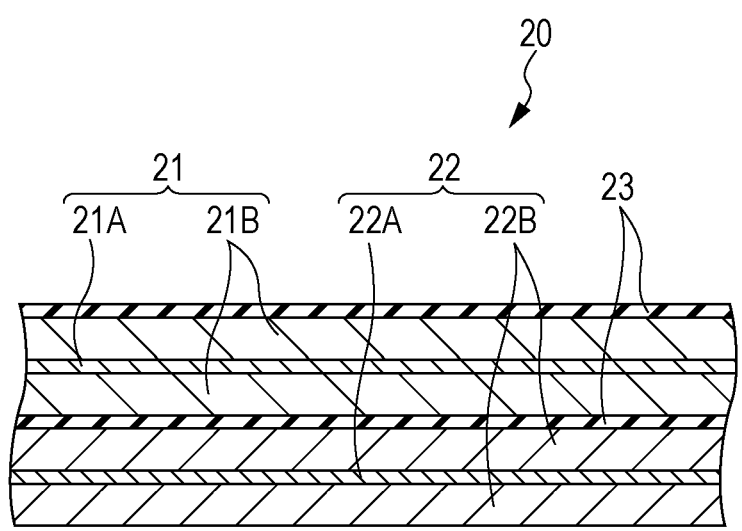
FIG. 5 is a cross-sectional view showing a first configuration example of an electrode laminated structure of a cylindrical battery according to a second embodiment of the present disclosure.

FIG. 5 is an enlarged view of a part of the wound electrode body 20 shown in FIG. 4. Hereinafter, the positive electrode 21, the negative electrode 22, and the separator 23 will be described in detail.

[Positive Electrode]

The positive electrode 21 is obtained such that a positive electrode active material layer 21B containing a positive electrode active material is formed on both surfaces of a positive electrode collector 21A. As the positive electrode collector 21A, a metal foil such as an aluminum (Al) foil, a nickel (Ni) foil, or a stainless (SUS) foil may be used.

The positive electrode active material 21B is, for example, constituted to contain a positive electrode active material, an electrically conductive agent, and a binder. As the positive electrode active material, any one kind or two or more kinds of positive electrode materials capable of intercalating and deintercalating lithium as a positive electrode active material are contained, and other materials such as a binder and an electrically conductive agent may be contained, if desired.

As the positive electrode material capable of intercalating and deintercalating lithium, lithium-containing compounds such as a lithium oxide, a lithium phosphate, a lithium sulfide, and an intercalation compound containing lithium are suitable. A mixture of two or more kinds thereof may be used. In order to increase the energy density, lithium-containing compounds containing lithium, a transition metal element, and oxygen (O) are preferable. Examples of such a lithium-containing compound include a lithium complex phosphate having a structure of an olivine type shown in (Chem. I) and a lithium complex oxide having a structure of a layered rock salt shown in (Chem. II). As the lithium-containing compound, those containing, as the transition metal element, at least one member selected from the group consisting of cobalt (Co), nickel (Ni), manganese (Mn), and iron (Fe) are more preferable. Examples of such a lithium-containing compound include a lithium complex phosphate having a structure of an olivine type shown in (Chem. III), a lithium complex oxide having a structure of a layered rock salt type shown in (Chems. IV, V, and VI), a lithium complex oxide having a structure of a spinel type shown in (Chem. VII), and the like. Specific examples thereof include $LiNi_{0.50}Co_{0.20}Mn_{0.30}O_2$, $Li_aCoO_2$ (a≅1), $Li_bNiO_2$ (b≅1), $Li_{c1}Ni_{c2}Co_{1-c2}O_2$ (c1≅1, 0≤c2≤1), $Li_dMn_2O_4$ (d≅1), and $Li_eF_ePO_4$ (e≅1).

$$Li_aM1_bPO_4 \quad \text{[Chem. I]}$$

(In the formula, M1 represents at least one member selected from the group consisting of elements of Groups 2 to 15; and a and b are values falling within the ranges of 0≤a≤2.0 and 0.5≤b≤2.0, respectively)

$$Li_cNi_{(1-d-e)}Mn_dM2_eO_{(1-f)}X_g \quad \text{[Chem. II]}$$

(In the formula, M2 represents at least one member selected from the group consisting of elements of Groups 2 to 15 other than nickel (Ni) and manganese (Mn); X represents at least one member selected from the group consisting of a Group 16 element and a Group 17 element other than oxygen (O); and c, d, e, f, and g are values falling within the ranges of 0≤c≤1.5, 0≤d≤1.0, 0≤e≤1.0, −0.10≤f≤0.20, and 0≤g≤0.2, respectively)

$$Li_hM3PO_4 \quad \text{[Chem. III]}$$

(In the formula, M3 represents at least one member selected from the group consisting of cobalt (Co), manganese (Mn), iron (Fe), Nickel (Ni) magnesium (Mg), aluminum (Al), boron (B), vanadium (V), niobium (Nb), copper (Cu), zinc (Zn), molybdenum (Mo), calcium (Ca), strontium (Sr), tungsten (W), and zirconium (Zr); h is a value falling within the range of 0.9≤h≤1.1; the composition of lithium varies depending upon the state of charge and discharge; and the value of z represents a value in a completely discharged state)

$$Li_iMn_{(1-j-k)}Ni_jM4_kO_{(1-m)}F_n \quad \text{[Chem. IV]}$$

(In the formula, M4 represents at least one member selected from the group consisting of cobalt (Co), magnesium (Mg), aluminum (Al), boron (B), titanium (Ti), vanadium (V), chromium (Cr), iron (Fe), nickel (Ni), copper (Cu), zinc (Zn), zirconium (Zr), molybdenum (Mo), tin (Sn), calcium (Ca), strontium (Sr), and tungsten (W); i, j, k, m, and n are values falling within the ranges of 0.8≤i≤1.2, 0<j<0.5, 0≤k≤0.5, j+k<1, −0.1≤m≤0.2, and 0≤n≤0.1, respectively; the composition of lithium varies depending upon the state of charge and discharge; and the value of i represents a value in a completely discharged state)

$$Li_oNi_{(1-p)}M5_pO_{(1-q)}F_r \quad \text{[Chem. V]}$$

(In the formula, M5 represents at least one member selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); o, p, q, and r are values falling within the ranges of 0.8≤o≤1.2, 0.005≤p≤0.5, −0.1≤q≤0.2, and 0≤r≤0.1, respectively; the composition of lithium varies depending upon the state of charge and discharge; and the value of o represents a value in a completely discharged state)

$$Li_sCo_{(1-t)}M6_tO_{(1-u)}F_v \quad \text{[Chem. VI]}$$

(In the formula, M6 represents at least one member selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); s, t, u, and v are values falling within the ranges of $0.8 \leq s \leq 1.2$, $0 \leq t < 0.5$, $-0.1 \leq u \leq 0.2$, and $0 \leq v \leq 0.1$, respectively; the composition of lithium varies depending upon the state of charge and discharge; and the value of s represents a value in a completely discharged state)

$$Li_w Mn_{(1-x)} M7_x O_y F_z \qquad \text{[Chem. VII]}$$

(In the formula, M7 represents at least one member selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); w, x, y, and z are values falling within the ranges of $0.9 \leq w \leq 1.1$, $0 \leq x \leq 0.6$, $3.7 \leq y \leq 4.1$, and $0 \leq g \leq 0.1$, respectively; the composition of lithium varies depending upon the state of charge and discharge; and the value of w represents a value in a completely discharged state)

When using the lithium complex phosphate having a structure of an olivine type shown in (Chem.s I and III) as the positive electrode active material, it is preferable that M1 of (Chem. I) and M3 of (Chem. III) may contain iron (Fe), and an increase in an amount of iron (Fe) may be preferable.

Moreover, from the viewpoint that higher electrode filling properties and cycle characteristics are obtainable, lithium may be formed as a complex particle obtained by coating the surface of a core particle composed of any one of the foregoing lithium-containing compounds by a fine particle composed of any one of other lithium-containing compounds or carbon materials.

Besides, examples of the positive electrode material capable of intercalating and deintercalating lithium ion include an oxide, a disulfide, a chalcogenide, and an electrically conductive polymer. Examples of the oxide include vanadium oxide ($V_2O_5$), titanium dioxide ($TiO_2$), and manganese dioxide ($MnO_2$). Examples of the disulfide include iron disulfide ($FeS_2$), titanium disulfide ($TiS_2$), and molybdenum disulfide ($MoS_2$). The chalcogenide is especially preferably a layered compound and a spinel type compound, and examples thereof include niobium diselenide ($NbSe_2$). Examples of the electrically conductive polymer include sulfur, polyaniline, polythiophene, polyacetylene, and polypyrrole. As a matter of course, the positive electrode material may be other material than those described above. Also, the foregoing series of positive electrode materials may be arbitrarily combined and used in admixture of two or more kinds thereof.

It is preferable that, in the measurement by the Brunauer-Emmett-Teller (BET) method of a case of using nitrogen ($N_2$) as adsorption gas, a specific surface area of the positive electrode active material be in the range of 0.05 $m^2/g$ or more and 2.0 $m^2/g$ or less, and preferably 0.2 $m^2/g$ or more 0.7 $m^2/g$ or less. In this range, it is possible to more effectively obtain charge and discharge capacities.

Also, examples of the electrically conductive agent include a carbon material such as carbon black and graphite. As the binder, at least one member selected from the group consisting of a resin material such as polyvinylidene fluoride (PVdF), polytetrafluoroethylene (PTFE), polyacrylonitrile (PAN), a styrene-butadiene rubber (SBR), and carboxymethyl cellulose (CMC) and a copolymer composed mainly of such a resin material is used.

The positive electrode 21 includes the positive electrode lead 25 that is connected to one end of the positive electrode collector 21A by spot welding or ultrasonic welding. The positive electrode lead 25 is preferably a metal foil or a mesh-like one, but may be even not a metal as long as it is electrochemically and chemically stable to thereby attain electric conduction. As a material of the positive electrode lead 25, for example, aluminum (Al), nickel (Ni), or the like may be used.

[Negative Electrode]

A negative electrode 22 has a structure in which a negative electrode active material layer 22B is provided on one surface or both surfaces of a negative electrode collector 22A, and is disposed so that the negative electrode active material layer 22B and the positive electrode active material layer 21B oppose to each other. A configuration of negative electrode 22 constituted of the negative electrode collector 22A and the negative electrode active material layer 22B is the same as that of the negative electrode 1 constituted of the negative electrode collector 1A and the negative electrode active material layer 1B according to the first embodiment.

[Separator]

A separator 23 partitions the positive electrode 21 and the negative electrode 22 from each other and is impregnated with an electrolytic solution to allow a lithium ion to pass therethrough while preventing a short circuit of the current caused due to contact of the both electrodes from occurring. The separator 23, for example, is constituted of a porous film or a nonwoven fabric which is made of polyolefin resin such as polypropylene (PP) or polyethylene (PE), and may have a structure in which two or more kinds of such a porous film are laminated. A porous film made of a polyolefin is preferable because it is excellent in an effect for preventing a short circuit from occurring and is able to contrive to enhance the safety of a battery due to a shutdown effect.

The separator 23 may use a fluorinated resin such as polyvinylidene fluoride (PVdF) or polytetrafluoroethylene (PTFE) other than polyolefin resin, and may be made of a porous film where these materials are mixed. Furthermore, polytetrafluoroethylene (PTFE) or polyvinylidene fluoride (PVdF) may be coated or deposited on the surface of a porous film made of polyethylene (PE) and polypropylene (PP). When forming the porous film made of polytetrafluoroethylene (PTFE) and polyvinylidene fluoride (PVdF) on the surface of the porous film, a porous film in which inorganic particles such as alumina ($Al_2O_3$) or silica ($SiO_2$) are mixed may be used.

[Electrolytic Solution]

An electrolytic solution contains an electrolyte salt and a solvent for dissolving the electrolyte salt.

For example, the electrolyte salt contains one kind or two or more kinds of a light metal compound such as a lithium salt. Examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). Of these, at least one selected from the group consisting of lithium hexafluorophosphate, lithium tetrafluoroborate, lithium perchlorate, lithium hexafluoroarsenate is preferable, and lithium hexafluorophosphate is more preferable.

Examples of the solvent include a lactone-based solvent such as γ-butyrolactone, γ-valerolactone, δ-valerolactone or ε-caprolactone, a carbonic acid ester-based solvent such as ethylene carbonate, propylene carbonate, butylene carbonate, vinylene carbonate, dimethyl carbonate, ethyl methyl carbonate, or diethyl carbonate, an ether-based solvent such as 1,2-dimethoxyethane, 1-ethoxy-2-methoxyethane, 1,2-diethoxyethane, tetrahydrofuran, or 2-methyl tetrahydrofuran, a nitril based-solvent such as acetonitrile, a sulfolane-based solvent, phosphoric acids, a phosphate ester solvent, or pyrrolidones. Among the solvents, any one may be used alone, or a mixture two or more kinds thereof may be used.

As the solvent, a mixture of cyclic carbonic ester and chain carbonic ester is preferably used, and a compound in which some or all of hydrogen of the cyclic carbonic ester or the chain carbonic ester are fluorinated is more preferable. As the fluorinated compound, fluoro ethylene carbonate (4-fluoro-1,3-dioxolan-2-one:FEC) or difluoro ethylene carbonate (4,5-difluoro-1,3-dioxolan-2-one:DFEC) is preferably used. This is because it is possible to improve charge and discharge cycle characteristics even when using the negative electrode 22 containing a compound such as silicon (Si), tin (Sn), or germanium (Ge) as the negative electrode active material. Of these, as the solvent, difluoro ethylene carbonate is preferably used. It is because excellent improvement in the cycle characteristics is achieved.

In addition, the electrolytic solution may be a nonaqueous electrolyte which is held on a polymer compound. The polymer compound that holds the electrolytic solution may be in a semi-solid state or a solid state which absorbs the solvent, and examples of the polymer compound may include fluorine-based polymer compounds such as a copolymer containing, for example, polyvinylidene fluoride (PVdF) or vinylidene fluoride (VdF) and hexafluoropropylene (HFP) as a repeating unit, ether-based polymer compounds such as polyethylene oxide (PEO) or a crosslinked body containing polyethylene oxide (PEO), and polymer compounds containing polyacrylonitrile (PAN), polypropylene oxide (PPO), or polymethyl methacrylate (PMMA) as a repeating unit. Among the polymer compounds, any one may be used alone, or a mixture two or more kinds thereof may be used.

In particular, from the viewpoint of oxidation reduction stability, the fluorine-based polymer compounds are preferable, and among the fluorine-based polymer compounds, a copolymer containing vinylidene fluoride and hexafluoropropylene as a component is preferable. Furthermore, this copolymer may contain, as a component, an unsaturated dibasic acid monoester such as monomethyl maleate (MMM), a halogenated ethylene such as trifluorochloroethylene (PCTFE), a cyclic carbonate of an unsaturated compound such as vinylene carbonate (VC), an epoxy group-containing acrylic vinyl monomer, or the like. This is because higher characteristics are obtainable.

2-2 Fabricating Method of Cylindrical Battery

[Fabricating Method of Positive Electrode]

A positive electrode mixture is adjusted by mixing a positive electrode active material, a conductive material, and a binder, and a paste-like positive electrode mixture slurry is fabricated by dispersing the positive electrode mixture in a solvent such as N-methyl-2-pyrrolidone or the like. Next, by applying the positive electrode mixture slurry onto the positive electrode collector 21A by a doctor blade or a bar coater, the solvent is dried, and the positive electrode active material layer 21B is formed by performing compression molding by a roll press machine or the like, thereby fabricating the positive electrode 21.

[Fabricating Method of Negative Electrode]

A negative electrode 22 is fabricated by the fabricating method described in the first embodiment.

[Preparation of Electrolytic Solution]

An electrolytic solution is prepared by dissolving a predetermined amount of electrolyte salt to the solvent.

[Assembly of Cylindrical Battery]

The negative electrode lead 26 is attached to the negative electrode collector 22A by welding or the like while the positive electrode lead 25 is attached to the positive electrode collector 21A by welding or the like. Next, the positive electrode 21 and the negative electrode 22 are wound via the separator 23 of the present disclosure to form a wound electrode body 20.

Next, a distal end of the positive electrode lead 26 is welded to the battery can 11 while a distal end of the positive electrode lead 25 is welded to the safety valve mechanism. Next, a wound surface of the wound electrode body 20 is housed inside the battery can 11 while being interposed between a pair of insulating plates 12a and 12b.

After housing the wound electrode body 20 in the battery can 11, electrolytic solution is injected into the battery can 11 so as to be impregnated in the separator 23. Subsequently, in the open end of the battery can 11, the safety valve mechanism constituted of the battery lid 13 and the safety valve 14 and the heat sensitive resistance element 17 are fixed by being caulked via the gasket 18. Therefore, the cylindrical battery 10 of the present disclosure shown in FIG. 4 is fabricated.

In the cylindrical battery 10, when performing charging, lithium ion is discharged from, for example, the positive electrode active material layer 21B, and intercalated to the negative electrode active material layer 22B via the electrolytic solution impregnated in the separator 23. In addition, when performing discharging, lithium ion is discharged from, for example, the negative electrode active material layer 22B, and intercalated to the positive electrode active material layer 21B via the electrolytic solution impregnated in the separator 23.

<Effect>

In the cylindrical battery 10 using the negative electrode 22 of the present disclosure, excellent cycle characteristics may be obtained.

3. Third Embodiment

In a third embodiment, a thin battery using the negative electrode according to the first embodiment will be described.

3-1 Configuration of Thin Battery

Figure 6:
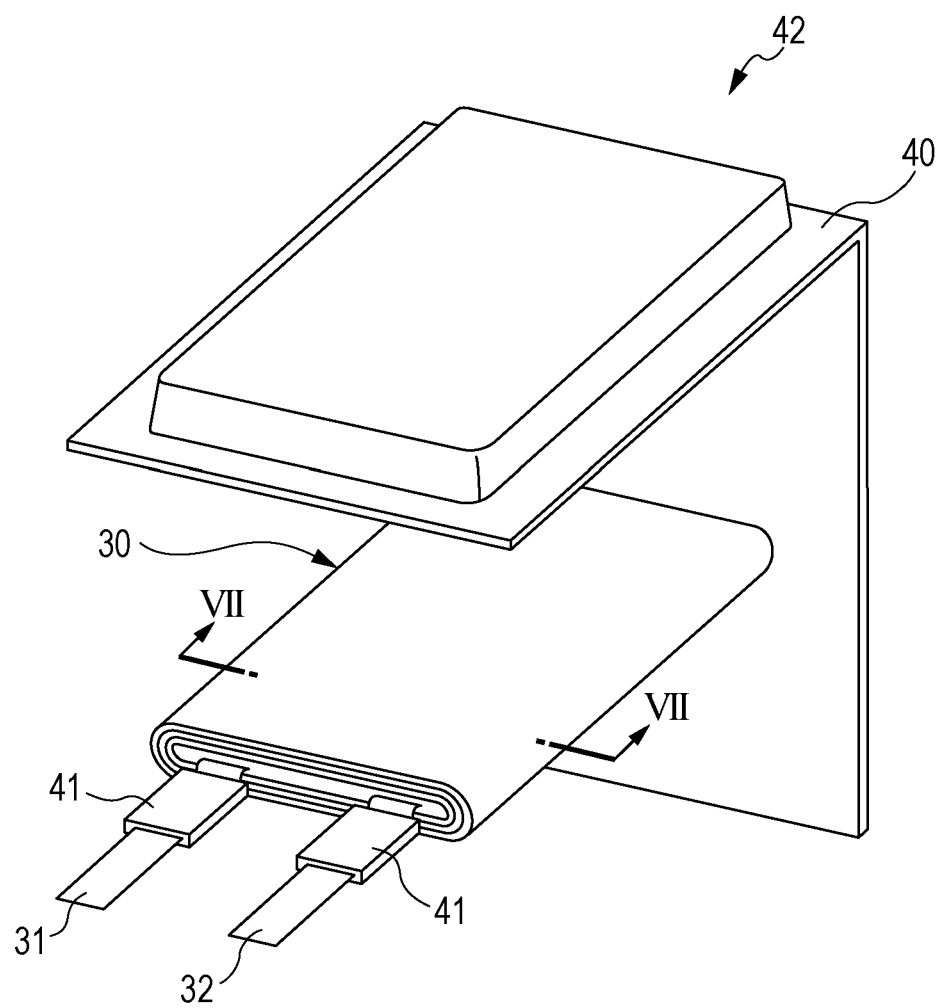
FIG. 6 is an exploded perspective view showing a first configuration example of a thin battery according to a third embodiment of the present disclosure.

FIG. 6 is a drawing showing a configuration of a thin battery 42 according to a third embodiment. The thin battery 42 is so-called laminated film type, and the wound electrode body 30 to which a positive electrode lead 31 and the negative electrode lead 32 are attached is housed in a film-like external package member 40 constituted of a laminated film or the like.

The positive electrode lead 31 and the negative electrode lead 32 are each led out, for example, in the same direction, from the inside of the sealed external package member 40 toward the outside thereof. The positive electrode lead 31 and the negative electrode lead 32 are each constituted of a metal material such as aluminum (Al), copper (Cu), nickel (Ni), or stainless steel (SUS), and formed in a thin plate state or a network state.

The external package member 40 is, for example, composed of a laminated film in which a resin layer is formed on both surfaces of a metal layer. In the laminated film, an outer resin layer is formed on the surface of the metal layer exposing to the outside of the battery, and an inner resin layer is formed on the inner surface of the battery opposing to a power generating element such as the wound electrode body 30.

The metal layer bears the most important role for preventing entry of moisture, oxygen, and light to protect the contents, and aluminum (Al) is most frequently used from the standpoints of light weight, elongation, costs, and ease of processing. The outer resin layer has a beautiful appearance, toughness, flexibility, and the like, and a resin material such as nylon and polyethylene terephthalate (PET) is used. The inner resin layer is a portion which is melted by heat or ultrasonic waves and mutually fused. Therefore, a polyolefin resin is appropriate, and cast polypropylene (CPP) is frequently used. If desired, an adhesive layer may be provided between the metal layer and the outer resin layer or inner resin layer.

In the external package member 40, for example, a recess for housing the wound electrode body 30, which is formed from the inner resin layer side toward the direction of the outer resin layer by means of deep drawing, is provided, and the inner resin layer is disposed opposing to the wound electrode body 30. The opposing inner resin layers of the external package member 40 are brought into close contact with each other in an external edge of the recess by means of fusion or the like. A contact film 41 for the purpose of enhancing adhesion between the inner resin layer of the package member 40 and the positive electrode lead 31 or the negative electrode lead 32 each composed of a metal material is disposed between the external package member 40 and the positive electrode lead 31 or the negative electrode lead 32. The contact film 41 is composed of a resin material having high adhesion to the metal material, and it is constituted of, for example, a polyolefin resin such as polyethylene (PE), polypropylene (PP), and modified polyethylene or modified polypropylene obtained by modifying such a material.

In addition, the external package member 40 may be constituted of a laminated film having other structure, a polymer film such as polypropylene, or a metal film in place of the foregoing aluminum laminated film in which a metal layer is composed of aluminum (Al).

Figure 7:
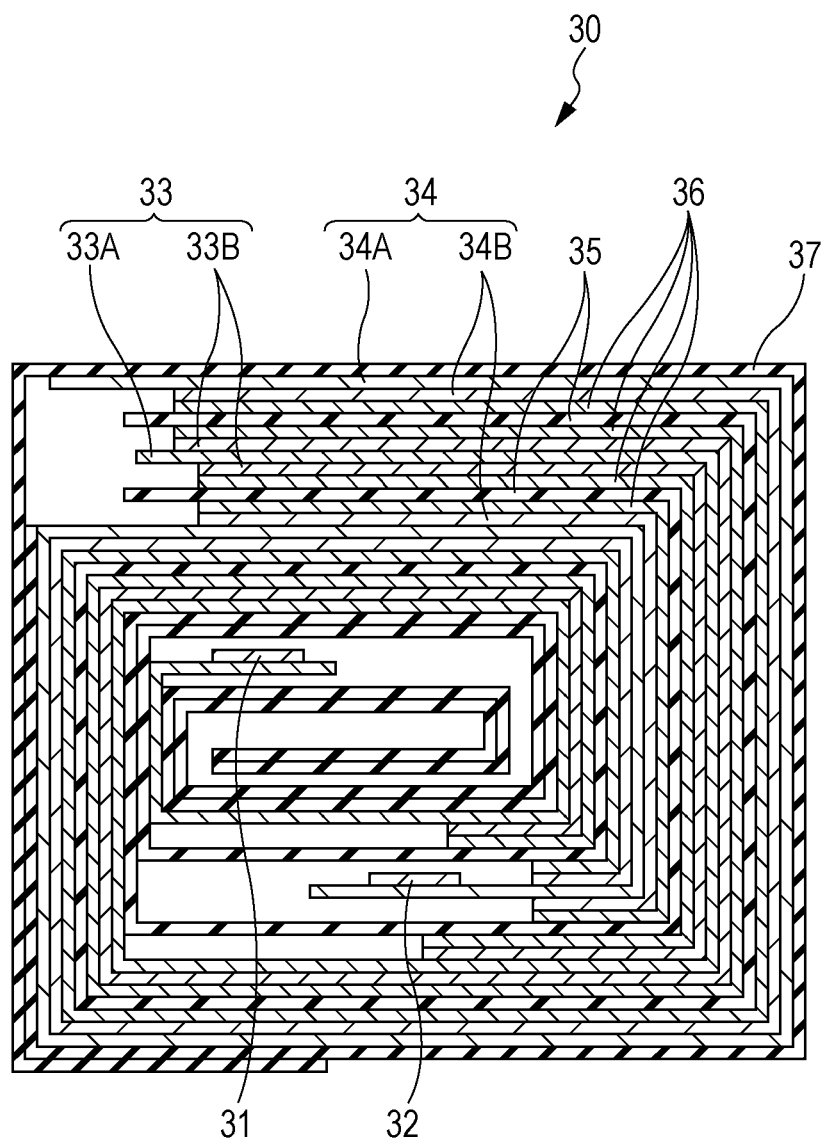
FIG. 7 is a cross-sectional view showing a first configuration example of a thin battery according to a third embodiment of the present disclosure.

FIG. 7 illustrates a sectional structure of the wound electrode body 30 shown in FIG. 6 along a VII-VII line. The wound electrode body 30 is one prepared by laminating and winding a positive electrode 33 and a negative electrode 34 via a separator 35 and a nonaqueous electrolyte 36, and an outermost peripheral portion thereof is protected by a protective tape 37, as occasion calls.

[Positive Electrode]

The positive electrode 33 has a structure in which a positive electrode active material layer 33B is provided on one surface or both surfaces of a positive electrode collector 33A. The configuration of the positive electrode 33 constituted of the positive electrode collector 33A and the positive electrode active material layer 33B is the same as the configuration of the positive electrode 21 constituted of the positive electrode collector 21A and the positive electrode active material layer 21B of the above-described second embodiment.

[Negative Electrode]

The negative electrode 34 has a structure in which a negative electrode active material layer 34B is provided on one surface or both surfaces of a negative electrode collector 34A, and the negative electrode active material layer 34B and the positive electrode active material layer 33B are disposed opposing to each other. The configuration of the negative electrode 34 constituted of the negative electrode collector 34A and the negative electrode active material layer 34B is the same as the configuration of the negative electrode 1 constituted of the negative electrode collector 1A and the negative electrode active material layer 1B in the above-described first embodiment.

[Separator]

The separator 35 is the same as the separator 23 according to the above-described second embodiment.

[Nonaqueous Electrolyte]

The nonaqueous electrolyte 36 is an electrolyte layer which contains an electrolytic solution and a polymer compound that is a holder for holding the electrolytic solution, and is in a semi-solid state or solid-state by absorbing the solvent of the polymer compound. The nonaqueous electrolyte is preferable because not only is a high ionic conductivity obtainable, but the liquid leakage of the battery can be prevented from occurring. In addition, in the thin battery 42 according to the third embodiment, the same electrolytic solution as that according to the second embodiment may be used instead of the nonaqueous electrolyte 36.

3-2 Fabricating Method of Thin Battery

The thin battery 42 can be, for example, fabricated in the following manner.

[Fabricating Method of Positive Electrode and Negative Electrode]

The positive electrode 33 and the negative electrode 34 can be fabricated by the same method as that according to the second embodiment.

[Assembly of Thin Battery]

A precursor solution containing an electrolytic solution, a polymer compound, and a mixed solvent is coated on each surface of the positive electrode 33 and the negative electrode 34, and the mixed solvent is then vaporized to form the nonaqueous electrolyte 36. Thereafter, the positive electrode lead 31 is installed in an end of the positive electrode collector 33A by means of welding, and the negative electrode lead 32 is also installed in an end of the negative electrode collector 34A by means of welding.

Subsequently, the positive electrode 33 and the negative electrode 34 each provided with the nonaqueous electrolyte 36 are laminated via the separator 35 to form a laminate, the laminate is then wound in the longitudinal direction thereof, and the protective tape 37 is allowed to adhere to the outermost peripheral portion to form the wound electrode body 30. Finally, for example, the wound electrode body 30 is interposed between the external package members 40, and the outer edges of the external package members 40 are brought into intimate contact with each other by means of heat fusion or the like, thereby sealing the wound electrode body 30. On that occasion, the contact film 41 is inserted between each of the positive electrode lead 31 and the negative electrode lead 32 and the external package member 40. According to this, the thin battery 42 shown in FIGS. 6 and 7 is completed.

This thin battery 42 may also be fabricated in the following manner. First, as described above, the positive electrode 33 and the negative electrode 34 are fabricated, the positive electrode lead 31 and the negative electrode lead 32 are attached to the positive electrode 33 and the negative electrode 34, respectively, and then the positive electrode 33 and the negative electrode 34 are laminated via the separator 35 so as to be wound. Then, the protective tape 37 is adhered to the outermost peripheral portion to thereby form the wound electrode body 30. Next, the wound electrode body 30 is interposed between the external package members 40 to enable an outer peripheral portion thereof except one side to be formed in a bag shape by means of heat fusion, and then housed in the external package member 40. Subsequently, a composition for electrolyte containing the electrolytic solution, a monomer that is a raw material of the polymer compound, a polymerization initiator, and optionally, other material such as a polymerization inhibitor is prepared and injected into the inside of the external package member 40.

After injecting the composition for electrolyte into the inside of the external package member 40, an opening of the external package member 40 is hermetically sealed by means of heat fusion in a vacuum atmosphere. Next, a monomer polymerized by heating is used as a polymer compound to thereby form the nonaqueous electrolyte 36 in a gel form, and therefore the thin battery 42 shown in FIGS. 6 and 7 may be assembled.

In addition, when using the electrolytic solution instead of the nonaqueous electrolyte 36 in the thin battery 42, the positive electrode 33 and the negative electrode 34 are laminated via the separator 35 so as to be wound, and the protective tape 37 is adhered to the outermost peripheral portion thereof, thereby forming the wound electrode body 30. Next, the wound electrode body 30 is interposed between the external package members 40 to enable the outer peripheral portion thereof except one side to be formed in a bag shape by means of heat fusion, and then housed in the external package member 40. Subsequently, the electrolytic solution is injected into the external package member 40, and the opening of the external package member 40 is hermetically sealed by means of heat fusion in a vacuum atmosphere, thereby assembling the thin battery 42.

3-3 Another Example of Thin Battery

Figure 8A:
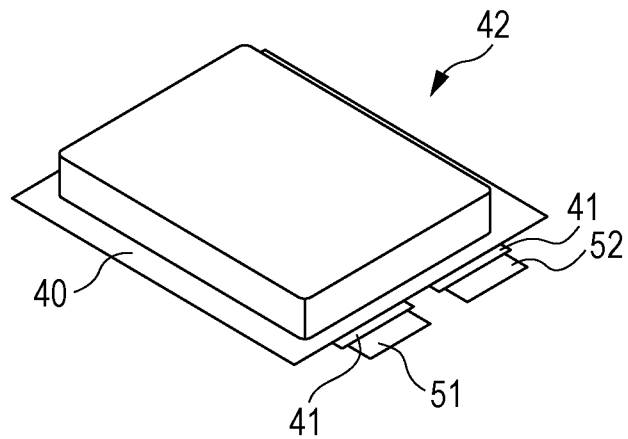
FIGS. 8A to 8C are exploded perspective views showing other configuration examples of a thin battery according to a third embodiment of the present disclosure.
Figure 8B:
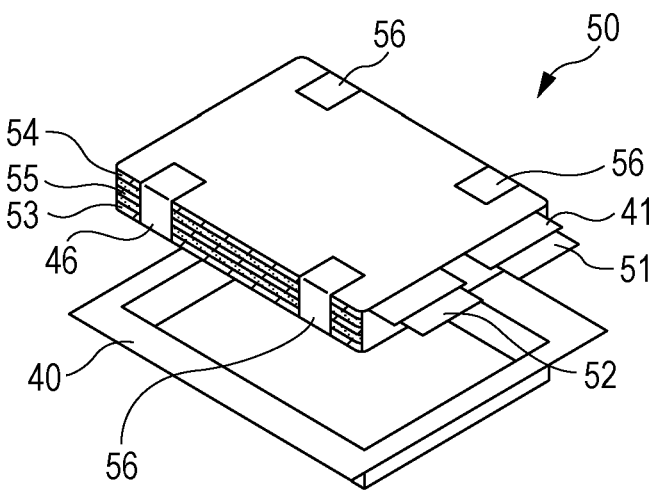
Figure 8C:
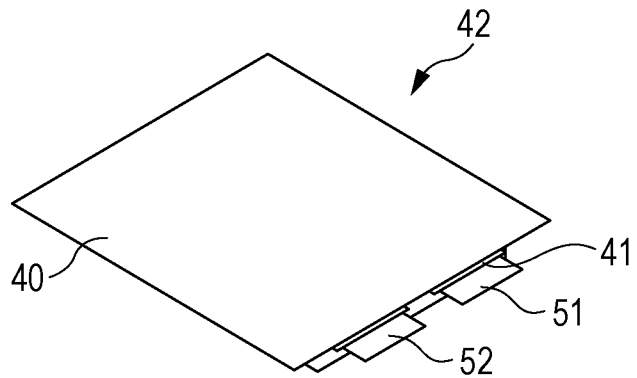

In the third embodiment, the thin battery 42 in which the wound electrode body 30 is externally packaged in the external package member 40 has been described, but as shown in FIGS. 8A to 8C, a laminate electrode body 50 may be used instead of the wound electrode body 30. FIG. 8A is an external view of the thin battery 42 that houses the laminate electrode body 50. FIG. 8B is an exploded perspective view showing a state in which the laminate electrode body 50 is housed in the external package member 40. FIG. 8C is an external view showing an appearance from a bottom surface of the thin battery 42 shown in FIG. 8A.

As the laminate electrode body 50, a laminate electrode body 50 in which a rectangular positive electrode 53 and a negative electrode 54 are laminated via a separator 55 and fixed by a fixing member 56 may be used. A positive electrode lead 51 connected with the positive electrode 53 and the negative electrode lead 52 connected with the negative electrode 54 are led out from the laminated electrode body 50, and a contact film 41 is provided between each of the positive electrode lead 51 and the negative electrode lead 52 and the external package member 40.

In addition, a fabricating method of the nonaqueous electrolyte layer (not shown), an injection method of the electrolytic solution, and a thermal fusion method of the external package member 40 are the same as those described in 3-2.

<Effect>

In the third embodiment, the same effects as those of the second embodiment may be obtained.

4. Fourth Embodiment

In a fourth embodiment, a coin-type battery 60 using the negative electrode according to the first embodiment will be described.

4-1 Configuration of Coin-Type Battery

Figure 9:
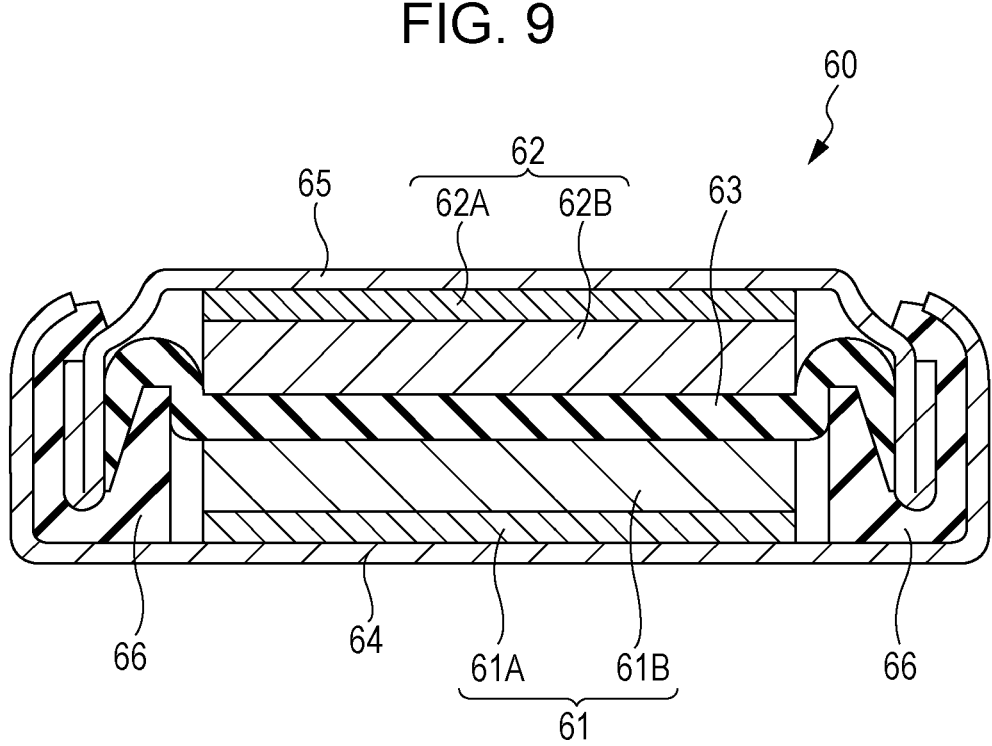
FIG. 9 is a cross-sectional view showing a first configuration example of a coin-type battery according to a fourth embodiment of the present disclosure.

FIG. 9 is a cross-sectional view showing an example of a configuration of a coin-type battery 60 according to a fourth embodiment.

[Positive Electrode]

A positive electrode 61 has a structure in which a positive electrode active material layer 61B is provided on one surface of a positive electrode collector 61A, and is formed in a pellet shape which is punched in a disc form with a predetermined size. A configuration of the positive electrode 61 constituted of the positive electrode collector 61A and the positive electrode active material layer 61B is the same as that of the positive electrode 21 constituted of the positive electrode collector 21A and the positive electrode active material layer 21B according to the above-described second embodiment.

[Negative Electrode]

A negative electrode 62 has a structure in which a negative electrode active material layer 62B is provided on one surface of a negative electrode collector 62A, and is formed in a pellet shape which is punched in a disc form with a predetermined size. The negative electrode active material layer 62B is disposed so as to oppose to the positive electrode active material layer 61B. A configuration of the negative electrode 62 constituted of the negative electrode collector 62A and the negative electrode active material layer 62B is the same as that of the negative electrode 1 constituted of the negative electrode collector 1A and the negative electrode active material layer 1B according to the above-described first embodiment.

[Separator]

A separator 63 has the same configuration as that of the separator 23 according to the above-described second embodiment, and is formed in a pellet shape which is punched in a disc form with a predetermined size.

In addition, a composition of the electrolytic solution impregnated in the separator 63 is the same as that of electrolytic solution in the first coin-type battery 60.

4-2 Fabricating Method of Coin-Type Battery

The coin-type battery 60 may be fabricated in such a manner that the negative electrode 62 is housed in an external package cup 65 while the positive electrode 61 is attached to an external package can 64, the positive electrode 61 and the negative electrode 62 are laminated via the separator 63 impregnated with electrolytic solution, and then they are caulked via a gasket 66.

<Effect>

In the fourth embodiment, the same effect as that of the second embodiment may be obtained.

5. Fifth Embodiment

In a fifth embodiment, a battery pack in which the battery (the cylindrical battery 10, the thin battery 42, or the coin-type battery 60) using the electrolyte of the present disclosure is prepared will be described.

Figure 10:
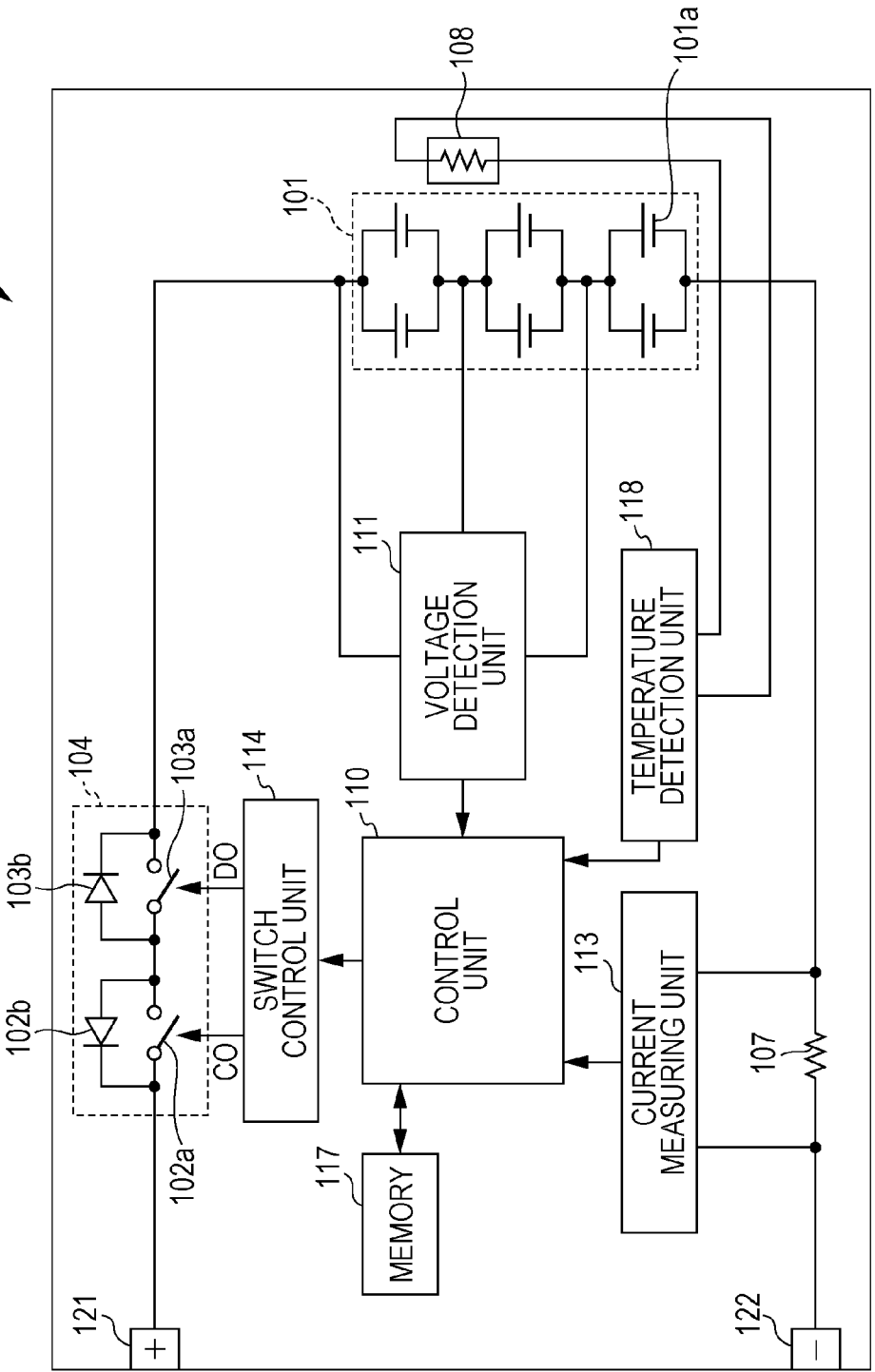
FIG. 10 is a block diagram showing a circuit configuration example of a battery pack according to a fifth embodiment of the present disclosure.

FIG. 10 is a block diagram showing an example of a circuit configuration in the case where the battery of the present disclosure (the cylindrical battery 10, the thin battery 42, or the coin-type battery 60) is applied to a battery pack 100. The battery pack 100 includes an assembled battery 101, an external package, a switch unit 104 having a charge control switch 102a and a discharge control switch 103a, a current detection resistor 107, a temperature detection device 108 and a control unit 110.

The battery pack 100 includes a positive electrode terminal 121 and a negative electrode terminal 122, and at the time of charge, the positive electrode terminal 121 and the negative electrode terminal 122 are connected to a positive electrode terminal and a negative electrode terminal of a battery charger, respectively, whereby charge is carried out. Also, at the time of using an electronic apparatus, the positive electrode terminal 121 and the negative electrode terminal 122 are connected to a positive electrode terminal and a negative electrode terminal of the electronic apparatus, respectively, whereby discharge is carried out.

In the assembled battery 101, a plurality of batteries 101a are connected in series and/or in parallel. This battery 101a is the battery according to the present disclosure. In addition, in FIG. 10, though the case where six batteries 101a are connected to each other, two in parallel and three in series (2P3S) is shown, besides, any connection method such as n in parallel and m in series (each of n and m is an integer) may be adopted.

The switch unit 104 includes the charge control switch 102a and a diode 102b and also the discharge control switch 103a and a diode 103b, and is controlled by the control unit 110. The diode 102b has a polarity of the reverse direction against a charge current flowing in the direction from the positive electrode terminal 121 to the assembled battery 101 and of the forward direction against a discharge current flowing in the direction from the negative terminal 122 to the assembled battery 101. The diode 103b has a polarity of the forward direction against the charge current and of the reverse direction against the discharge current. Incidentally, in this example, though the switch unit 104 is provided on the "+" side, it may also be provided on the "−" side.

In the case where the battery voltage becomes an overcharge detection voltage, the charge control switch 102a is turned off and controlled by the control unit 110 in such a manner that the charge current does not flow into a current path of the assembled battery 101. After the charge control switch 102a is turned off, it becomes possible to undergo only discharge by going through the diode 102b. Also, in the case where a large current flows at the time of charge, the charge control switch 102a is turned off and controlled by the control unit 110 in such a manner that the charge current which flows into the current path of the assembled battery 101 is interrupted.

In the case where the battery voltage becomes an overdischarge detection voltage, the discharge control switch 103a is turned off and controlled by the control unit 110 in such a manner that the discharge current does not flow into the current path of the assembled battery 101. After the discharge control switch 103a is turned off, it becomes possible to undergo only charge by going through the diode 103b. Also, in the case where a large current flows at the time of discharge, the discharge control switch 103a is turned off and controlled by the control unit 110 in such a manner that the discharge current which flows into the current path of the assembled battery 101 is interrupted.

The temperature detection device 108 is, for example, a thermistor and is provided in the vicinity of the assembled battery 101, and it measures a temperature of the assembled battery 101 and supplies the measured temperature to the control unit 110. A voltage detection unit 111 measures voltages of the assembled battery 101 and the respective batteries 101a constituting the assembled battery 101, and it A/D converts this measured voltage and supplies the converted voltage to the control unit 110. A current measurement unit 113 measures the current by using the current detection resistor 107 and supplies this measured current to the control unit 110.

A switch control unit 114 controls the charge control switch 102a and the discharge control switch 103a of the switch unit 104 on the basis of the voltage and the current inputted from the voltage detection unit 111 and the current measurement unit 113, respectively. When the voltage of any one of the batteries 101a becomes not more than an overcharge detection voltage or an overdischarge detection voltage, or a large current suddenly flows, the switch control unit 114 sends a control signal to the switch unit 104, thereby preventing overcharge or overdischarge, or overcurrent charge and discharge from occurring.

As the charge and discharge switch, a semiconductor switch, for example, MOSFET, etc., can be used. In that case, a parasitic diode of MOSFET functions as the diodes 102b and 103b. In the case where a P-channel type FET is used as the charge and discharge switch, the switch control unit 114 supplies control signals DO and CO to respective gates of the charge control switch 102a and the discharge control switch 103a, respectively. In the case of the P-channel type, the charge control switch 102a and the discharge control switch 103a are turned on by a gate potential lower by a prescribed value or more than a source potential. That is, in the usual charge and discharge operations, the charge control switch 102a and the discharge control switch 103a are turned in the ON state while taking the control signals CO and DO as low levels.

Then, for example, on the occasion of overcharge or overdischarge, the charge control switch 102a and the discharge control switch 103a are turned in the OFF state while taking the control signals CO and DO as high levels.

A memory 117 is composed of RAM or ROM and is, for example, composed of an erasable programmable read only memory (EPROM) that is a non-volatile memory, or the like. The memory 117 previously stores numerical values calculated by the control unit 110, an inner battery resistance value of the respective battery 101a in an initial state measured at the stage of a fabricating process, and so on. Also, it is possible to properly achieve rewriting. Also, by allowing the memory 117 to store a complete charge capacity of the battery 101a, the memory 117 is able to calculate, for example, a remaining capacity together with the control unit 110.

In a temperature detection unit 118, the temperature is measured using the temperature detection device 108, thereby carrying out the charge and discharge control at the time of abnormal heat generation or carrying out the correction in calculating the remaining capacity.

6. Sixth Embodiment

In a sixth embodiment, an apparatus, for example, an electronic apparatus, an electric vehicle, an electricity storage apparatus, etc., which is mounted with each of the batteries according to the second to fourth embodiments and the battery pack 100 according to the fifth embodiment, is described. The battery and the battery pack 100 described in the second to fifth embodiments can be used for the purpose of supplying an electric power to an apparatus, for example, an electronic apparatus, an electric vehicle, an electricity storage apparatus, etc.

Examples of the electronic apparatus include a laptop personal computer, PDA (personal digital assistants), a mobile phone, a cordless phone handset, a video movie camera, a digital still camera, an electronic book, an electronic dictionary, a music player, a radio, a headphone, a game player, a navigation system, a memory card, a pacemaker, a hearing aid, a power tool, an electric shaver, a refrigerator, an air conditioner, a television, a stereo, a water heater, a microwave oven, a dishwasher, a washing machine, a dryer, an illuminator, a toy, a medical appliance, a robot, a road conditioner, and a signal.

Also, examples of the electric vehicle include a railway vehicle, a golf cart, an electric cart, and an electric car (inclusive of a hybrid car), and the foregoing battery and battery pack are used as a driving power source or auxiliary power source for these electric vehicles.

Examples of the electricity storage apparatus include a power source for electricity storage used for buildings including houses or electric power generation facilities.

Among the foregoing application examples, specific examples of the electricity storage system using an electricity storage apparatus to which the battery according to the present disclosure is applied are hereunder described.

Examples of this electricity storage system include the following configurations. A first electricity storage system is an electricity storage system in which the electricity storage apparatus is charged by an electric power generation apparatus for performing the electric power generation from renewable energy. A second electricity storage system is an electricity storage system having an electricity storage apparatus and supplying an electric power to an electronic appliance to be connected to the electricity storage apparatus. A third electricity storage system is an electric appliance which receives the supply of an electric power from an electricity storage apparatus. These electricity storage systems are carried out as a system for contriving to efficiently supply an electric power in cooperation with an external electric power supply network.

Furthermore, a fourth electricity storage system is an electric vehicle having a conversion apparatus of receiving the supply of an electric power from an electricity storage apparatus and converting it to a driving force of the vehicle and a control device of performing information processing regarding the vehicle control on the basis of the information regarding the electricity storage apparatus. A fifth electricity storage system is an electric power system including an electric power information transmission and reception unit for transmitting and receiving signals relative to other appliance via a network and performing charge and discharge control of the foregoing electricity storage apparatus on the basis of the information which the transmission and reception unit receives. A sixth electricity storage system is an electric power system of receiving the supply of an electric power from the foregoing electricity storage apparatus, or supplying an electric power to the electricity storage apparatus from the electric power generation apparatus or electric power network. The electricity storage systems are hereunder described.

6-1 Electricity Storage System in House as Application Example

Figure 11:
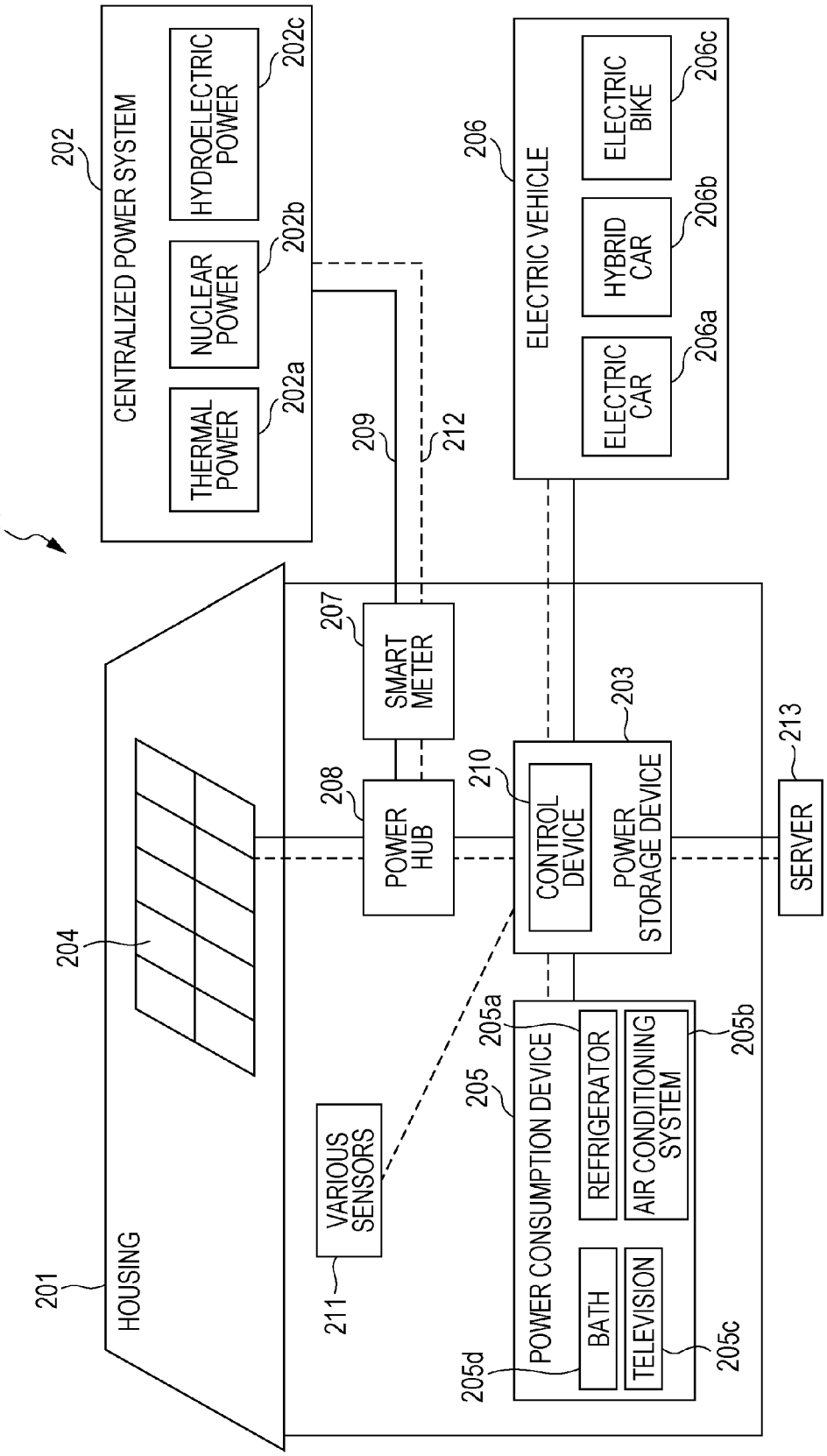
FIG. 11 is a schematic view showing an example of an electricity storage system for house according to a sixth embodiment of the present disclosure.

An example in which the electricity storage apparatus using the battery according to the present disclosure is applied to an electricity storage system for house is described by reference to FIG. 11. For example, in an electricity storage system 200 for a house 201, an electric power is supplied to an electricity storage apparatus 203 from a centralized electric power system 202 including thermal power generation 202a, atomic power generation 202b, hydroelectric power generation 202c, and the like via an electric power network 209, an information network 212, a smart meter 207, a power hub 208, and the like. As the electricity storage apparatus 203, the above-described battery or the battery pack according to the present disclosure may be applied to the electricity storage apparatus 203. At the same time, an electric power is supplied to the electricity storage apparatus 203 from an independent power source such as a domestic electric power generation apparatus 204. The electric power supplied from the electricity storage apparatus 203 is stored. An electric power to be used in the house 201 is supplied using the electricity storage apparatus 203. The same electricity storage system can be used for not only the house 201 but also buildings.

The house 201 is provided with the domestic electric power generation apparatus 204, an electric power consuming apparatus 205, the electricity storage apparatus 203, a control device 210 for controlling various apparatuses, the smart meter 207, and various sensors 211 for acquiring information. The respective apparatuses are connected to each other by the electric power network 209 and the information network 212. As the domestic electric power generation apparatus 204, a solar cell, a fuel cell, and the like are utilized, and the generated electric power is supplied to the electric power consuming apparatus 205 and/or the electricity storage apparatus 203. The electric power consuming apparatus 205 includes a refrigerator 205a, an air-conditioning apparatus 205b, a television receiver 205c, a bath 205d, and so on. Furthermore, the electric power consuming apparatus 205 includes an electric vehicle 206. The electric vehicle 206 includes an electric car 206a, a hybrid car 206b, and an electric motorcycle 206c.

The battery according to the present disclosure is applied to the electricity storage apparatus 203. The battery according to the present disclosure may be, for example, constituted of the foregoing lithium ion secondary battery. The smart meter 207 is provided with a function to measure the use amount of a commercial electric power and transmit the measured use amount to an electric power company. The electric power network 209 may be combined with any one or a plurality of direct current electricity supply, alternating current electricity supply, and non-contact electricity supply.

Examples of the various sensors 211 include a human sensitive sensor, an illuminance sensor, an object detection sensor, a consumed electric power sensor, a vibration sensor, a contact sensor, a temperature sensor, and an infrared ray sensor. The information acquired by the various sensors 211 is transmitted to the control device 210. According to the information from the sensors 211, the state of weather, the state of a human, or the like is grasped, and the electric power consuming apparatus 205 is automatically controlled, thereby enabling one to minimize the energy consumption. Furthermore, the control device 210 is able to transmit the information regarding the house 201 to an external electric power company or the like via internet.

Processing such as branching of an electric power line and direct current-alternating current conversion is performed by the power hub 208. Examples of a communication system of the information network 212 which is connected to the control device 210 include a method of using a communication interface such as universal asynchronous receiver-transceiver (UART) and a method of utilizing a sensor network according to the radio communication standards such as Bluetooth, ZigBee, and Wi-Fi. The Bluetooth system is applied to the multimedia communication, thereby enabling one to achieve communication of one-to-many connections. The ZigBee uses the physical layer of Institute of Electrical and Electronics Engineers (IEEE) 802.15.4. IEEE 802.15.4 is a name of the wireless short-distance area network standards called personal area network (PAN) or wireless personal area network (WPAN).

The control device 210 is connected to an external server 213. This server 213 may be controlled by any one of the house 201, an electric power company and a service provider. Examples of the information which the server 213 transmits and receives include consumed electric power information, life pattern information, electric power charge, weather information, natural disaster information, and electric power trade. Though a domestic electric power consuming apparatus 205 (for example, a television receiver) may transmit and receive such information, an apparatus outside the home (for example, a mobile phone, etc.) may also transmit and receive the information. Such information may be displayed on an appliance having a display function, for example, a television receiver, a mobile phone, personal digital assistants (PDA), etc.

The control device 210 for controlling the respective parts is constituted of central processing unit (CPU), random access memory (RAM), read only memory (ROM), and so on, and in this example, the control device 210 is housed in the electricity storage apparatus 203. The control device 210 is connected to the electricity storage apparatus 203, the domestic electric power generation apparatus 204, the electric power consuming apparatus 205, the various sensors 211, and the server 213 by the information network 212, and for example, it has a function to adjust the use amount of a commercial electric power and the amount of electric power generation. Incidentally, besides, the control device 210 may include a function to perform electric power trade in the electric power market.

As above, the generated electric power of not only the centralized electric power system 202 whose electric power comes from the thermal power generation 202a, the atomic power generation 202b, the hydroelectric power generation 202c, and the like but the domestic electric power generation apparatus 204 (by photovoltaic power generation and wind power generation) can be stored in the electricity storage apparatus 203. In consequence, even when the generated electric power of the domestic electric power generation apparatus 204 changes, it is possible to undergo the control such that the amount of electric power to be sent out externally is made constant, or only a necessary amount of discharge is achieved. For example, there may also be adopted a manner of use such that not only an electric power obtained by photovoltaic power generation is stored in the electricity storage apparatus 203, but a late-night electric power whose charge is inexpensive in the night is stored in the electricity storage apparatus 203, and the electric power stored by the electricity storage apparatus 203 is discharged and utilized in a time zone of the daytime when the charge is expensive.

Incidentally, in this example, while an example in which the control device 210 is housed within the electricity storage apparatus 203 has been described, the control device 210 may be housed within the smart meter 207, or may be constituted alone. Furthermore, the electricity storage system 200 may be used while making a plurality of homes in an apartment house objective, or making a plurality of independent houses objective.

6-2 Electricity Storage System in Vehicle as Application Example

Figure 12:
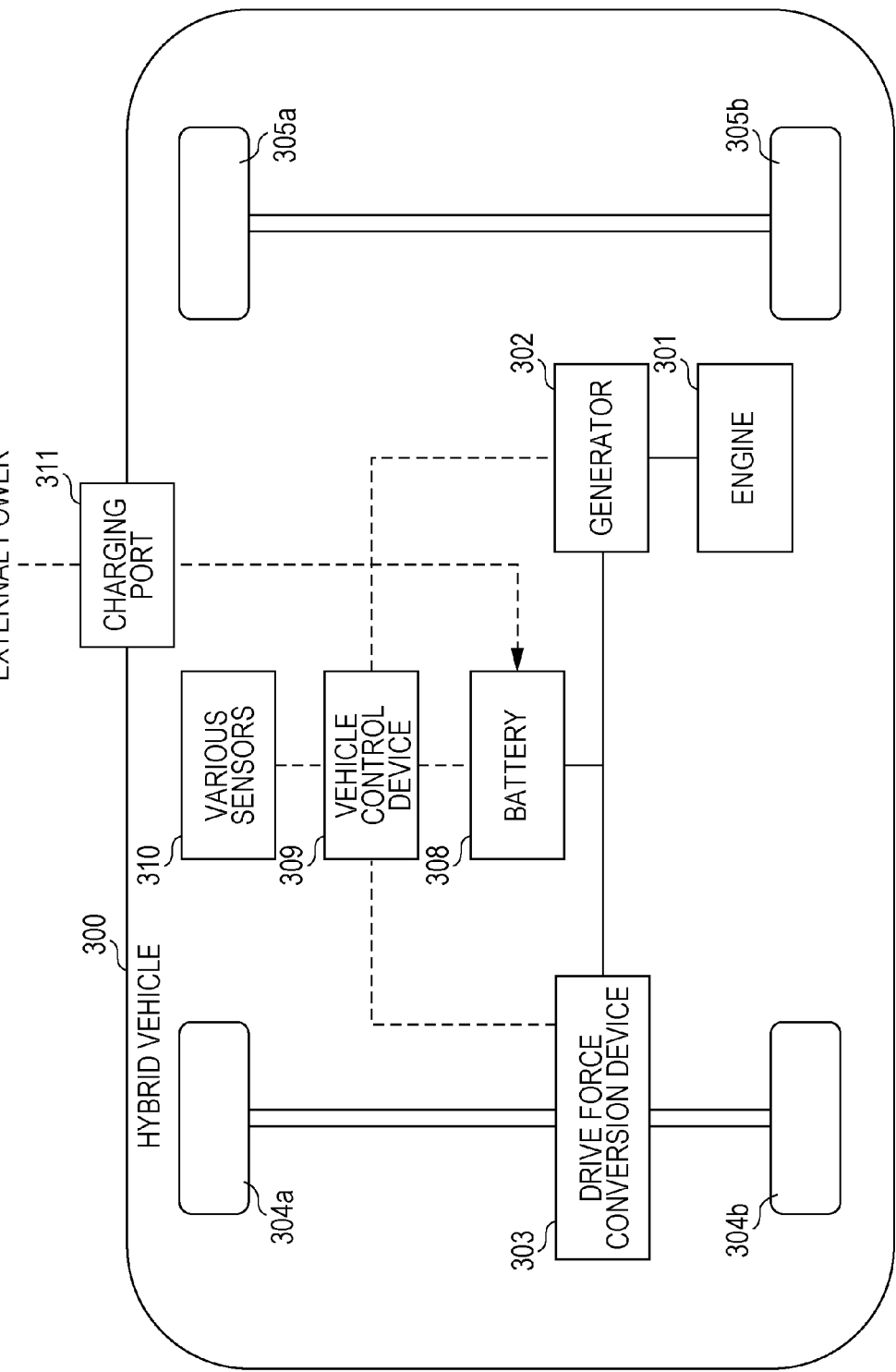
FIG. 12 is a schematic view showing an example of a configuration of a hybrid vehicle adopting a series hybrid system according to a sixth embodiment of the present disclosure.

An example in which the present disclosure is applied to an electricity storage system for vehicle is described by reference to FIG. 12. FIG. 12 schematically shows an example of a configuration of a hybrid vehicle adopting a series hybrid system to which the present disclosure is applied. The series hybrid system is a vehicle running with an electric power driving force conversion apparatus using an electric power generated by an electric power generator to be operated by an engine, or an electric power obtained by once storing the foregoing electric power in a battery.

This hybrid vehicle 300 is mounted with an engine 301, an electric power generator 302, an electric power driving force conversion apparatus 303, a driving wheel 304a, a driving wheel 304b, a wheel 305a, a wheel 305b, a battery 308, a vehicle control device 309, various sensors 310, and a charge port 311. The foregoing battery and the battery pack according to the present disclosure is applied to the battery 308.

The hybrid vehicle 300 runs using the electric power driving force conversion apparatus 303 as a power source. An example of the electric power driving force conversion apparatus 303 is a motor. The electric power driving force conversion apparatus 303 is actuated by the electric power of the battery 308, and a torque of this electric power driving force conversion apparatus 303 is transmitted to the driving wheels 304a and 304b. Incidentally, any of an alternating current motor or a direct current motor is applicable to the electric power driving force conversion apparatus 303 by using direct current-alternating current (DC-AC) conversion or reverse conversion (AC-DC conversion) in a necessary area. The various sensors 310 control the engine speed via the vehicle control device 309, or control an opening of a non-illustrated throttle valve (throttle opening). The various sensors 310 include a speed sensor, an acceleration sensor, and an engine speed sensor.

A torque of the engine 301 is transmitted to the electric power generator 302, and an electric power produced in the electric power generator 302 by that torque can be stored in the battery 308.

When the hybrid vehicle 300 slows down due to a non-illustrated braking mechanism, the resistance at the time of slowdown is added as a torque to the electric power driving force conversion apparatus 303, and a regenerative electric power produced by the electric power driving force conversion apparatus 303 due to that torque is stored in the battery 308.

When the battery 308 is connected to an external power source of the hybrid vehicle 300, it receives the supply of an electric power from the external power source through the charge port 311 as an input port, and it is also possible to store the received electric power.

While illustration is omitted, an information processing apparatus for undergoing the information processing regarding vehicle control on the basis of the information regarding a battery may be included. Examples of such an information processing apparatus include an information processing apparatus for undergoing display of a remaining battery life on the basis of the information regarding the remaining battery life.

In addition, as described above, the series hybrid vehicle running with a motor using an electric power generated by an electric power generator to be operated by an engine, or an electric power obtained by once storing the foregoing electric power in a battery has been described as an example. However, it is possible to effectively apply the present disclosure to a parallel hybrid vehicle using outputs of all of an engine and a motor as driving sources, which is used by properly switching three systems including running with only the engine, running with only the motor, and running with both of the engine and the motor. Furthermore, it is possible to effectively apply the present disclosure to a so-called electric vehicle running by driving with only a drive motor without using an engine.

EXAMPLES

The present disclosure is hereunder described in detail with reference to the following Examples. In addition, a configuration of the present disclosure is not limited to the following Examples.

Example 1

[Fabricating of Positive Electrode]

90.8 parts by mass of lithium transition metal composite oxide (LiNi$_{0.50}$Co$_{0.20}$Mn$_{0.30}$O$_2$) as a positive electrode active material, 4.2 parts by mass of graphite as an electrically conductive agent, 5 parts by mass of polyvinylidene fluoride (PVdF) as a binder were mixed to prepare a positive electrode mixture. Subsequently, the positive electrode mixture was dispersed in N-methyl-2-pyrrolidone (NMP) of a solvent to prepare a positive electrode mixture slurry in a paste form. Next, the positive electrode mixture slurry was uniformly coated on one surface of a positive electrode collector made of a strip-shaped aluminum (Al) foil having a thickness of 15 μm, and then dried. Next, the resultant was compression molded by a roll press machine to fabricate a positive electrode active material layer having a thickness of 60 μm and a volume density of 3.25 g/cm$^3$. Finally, the positive electrode collector that forms the positive electrode active material layer was punched in a disc form with a predetermined size to form a pellet-like positive electrode.

[Fabricating of Negative Electrode]

95 parts by mass of a granular natural graphite powder as a negative electrode active material, 5 parts by mass of a styrene-butadiene rubber (SBR) as a binder were mixed to fabricate a negative electrode mixture. The negative electrode mixture was dispersed in N-methyl-2-pyrrolidone (NMP) to prepare a negative electrode mixture slurry in a paste form. Next, the negative electrode mixture slurry was uniformly coated on one surface of a negative electrode collector made of a copper (Cu) foil having a thickness of 15 μm, and then dried. Next, the resultant was compression molded by the roll press to fabricate a negative electrode active material layer having a thickness of 50 μm and a volume density of 1.65 g/cm$^3$.

In this instance, a negative electrode active material layer whose orientation degree, pore volume, or the like were the following numerical values was formed by preparing press conditions (speed, pressure, gap, frequency) at the time of compression molding by the roll press machine. Specifically, in an X-ray diffraction device (manufactured by Rigaku Corporation, RINT 2000), when performing XRD measurement in the following conditions, an orientation degree A was 100, an orientation degree B of the entire negative electrode active material layer was 140, and a ratio of the orientation degrees A and B (orientation degree B/orientation degree A) was 1.40 in the negative electrode active material layer (inner layer of the negative electrode active material layer) from the negative electrode collector up to ½ of a thickness of the negative electrode active material layer in a surface direction of the negative electrode active material layer.

In addition, as shown in FIG. 13A, the orientation degree B was a peak ratio (peak intensity of carbon 002 face of the negative electrode active material/peak intensity of carbon 110 face) of a carbon 002 face thereof and a carbon 110 face obtained by XRD measurement of the entire negative electrode active material layer. In addition, when measuring the above-described orientation degree A, the negative electrode was hardened by resin, and polished until the negative electrode active material layer has a layer thickness of ½. Next, as shown in FIG. 13B, the inner layer of the negative electrode active material layer was exposed, and a peak intensity ratio was obtained by performing XRD measurement in the same manner.

[Measurement Conditions]

Target: Cu
X-ray output: 40 kV, 100 mA
Measurement range: 2θ=20° to 80°
Step angle: 0.02°
Counting time per one step: 3.0 seconds In addition, in the negative electrode active material layer, a pore volume ratio (pore volume B/pore volume A) of a pore volume A [ml/g] in a range of 0.001 μm or more and 0.4 μm or less of a pore diameter measured by a mercury porosimeter (manufactured by Shimadzu Corporation, Autopore IV9500) and a pore volume B [ml/g] in a range of 0.4 μm or more and 10 μm or less of the pore diameter was 1.35.

Finally, the negative electrode collector that forms the negative electrode active material layer was punched in a disc form with a predetermined size to form a pellet-like negative electrode.

[Fabricating of Electrolytic Solution]

A mixture solvent in which ethylene carbonate (EC), ethyl methyl carbonate (EMC), and dimethyl carbonate (DMC) were mixed at a volume ratio of 2:2:6 as electrolytic solution, and lithium hexafluorophosphate (LiPF$_6$) as electrolyte salt were used. A concentration of lithium hexafluorophosphate (LiPF$_6$) within the electrolytic solution was 1 mol/dm$^3$.

[Separator]

As a separator, a porous film made of polyethylene with a thickness of 23 m was used.

[Preparation of Test Battery]

The fabricated pellet-like positive electrode and negative electrode were laminated via the separator so that the positive electrode active material layer and the negative electrode active material layer oppose to each other, and were housed within the external package cup and the external package can so as to be caulked through the gasket. Therefore, a test battery constituted of a coin-type battery with a diameter of 20 mm and a height of 1.6 mm was prepared.

Example 2 to Example 18, Comparative Example 1 to Comparative Example 7, and Reference Example 1 to Reference Example 3

In Examples 2 to 18, Comparative Examples 1 to 7, and Reference Examples 1 to 3, a thickness of the negative electrode active material layer, a volume density, an orientation degree A in the inner layer of the negative electrode active material layer, an orientation degree B of the entire negative electrode active material layer, a ratio (orientation degree B/orientation degree A) of the orientation degree A and the orientation degree B, a pore volume ratio (pore volume B/pore volume A) were set as shown in Table 1 by adjusting the press conditions. In addition, a thickness of the positive electrode active material layer was appropriately adjusted according to the thickness of the negative electrode active material layer. Other than these, the test battery constituted of the coin-type battery was fabricated in the same manner as Example 1.

In addition, by adjusting the press conditions as shown below, the orientation degree A and the orientation degree B may be changed.

At the time of press, a collapse property of the negative electrode active material layer becomes smaller as the press speed is slowed, thereby controlling the orientation degree of the entire negative electrode active material layer to be low. In the same manner, as the press pressure is smaller, it is possible to control the orientation degree of the negative electrode active material layer to be low. In addition, when a gap between a pair of rolls that performs pressing is a significantly small area with respect to a thickness of the negative electrode, the collapse property of the surface of the negative electrode active material layer is large, and therefore an orientation degree of the outermost surface portion becomes particularly larger. In addition, multi-stage press that performs a pressing operation multiple times instead of once may be performed. The Collapse property of the negative electrode active material layer is smaller as the number of times of pressing is smaller, and therefore it is possible to control the orientation degree of the entire negative electrode active material layer to be low.

The above-described press conditions are combined so that the orientation degree A and the orientation degree B were adjusted to be numeral values shown in Table 1. In addition, at this instance, the orientation degree ratio (orientation degree B/orientation degree A), the pore volume ratio (pore volume B/pore volume A), and the volume density were also adjusted to be numeral values shown in Table 1.

[Evaluation of Test Battery: Charge and Discharge Cycle Characteristics]

The test battery of each of Examples, each Comparative Examples, and each of Reference Examples was subjected to constant-current charge in an atmosphere at 23° C. under a condition of 1 C rate until the battery voltage reached 4.2 V and then switched to constant-voltage charge at 4.2 V, and the constant-voltage charge was terminated at the point of time when a total charge time reached 2.5 hours. Thereafter, the test battery was subjected to constant-current discharge under a condition of 5 C rate until the battery voltage reached 2.5 V, and at the same time, a discharge capacity was measured to be used as a first discharge capacity.

By repeating the charging and discharging 100 cycles under the above-described conditions, a discharge capacity was measured at the 100 cycles. Subsequently, a capacity retention rate at the 100 cycles was calculated by the following Equation.

Capacity retention rate [%]=(discharge capacity at 100 cycles/first discharge capacity)×100

Evaluation Results are shown in the following Table 1.

TABLE 1

| | Negative electrode active material layer | | | | | | |
|---|---|---|---|---|---|---|---|
| | Layer thickness [μm] | Orientation degree A in active material layer up to ½ of layer thickness in surface direction of active material layer from collector | Orientation degree B in active material layer | Orientation degree ratio (orientation degree B/orientation degree A) | Pore volume ratio (pore volume B/pore volume A) | Volume density [g/cm$^3$] | Capacity retention rate[%] |
| Example 1 | 50 | 100 | 140 | 1.40 | 1.35 | 1.65 | 93.8 |
| Example 2 | 50 | 100 | 150 | 1.50 | 1.35 | 1.65 | 94.3 |
| Example 3 | 50 | 100 | 140 | 1.40 | 2.10 | 1.65 | 95.2 |
| Example 4 | 50 | 101 | 152 | 1.50 | 3.39 | 1.40 | 98.5 |
| Example 5 | 50 | 115 | 186 | 1.62 | 3.25 | 1.50 | 98.7 |
| Example 6 | 50 | 130 | 245 | 1.88 | 3.02 | 1.65 | 98.3 |
| Example 7 | 55 | 100 | 160 | 1.60 | 3.40 | 1.40 | 98.8 |
| Example 8 | 55 | 125 | 190 | 1.52 | 3.12 | 1.50 | 98.4 |
| Example 9 | 55 | 140 | 260 | 1.86 | 2.96 | 1.65 | 99.0 |
| Example 10 | 70 | 110 | 203 | 1.85 | 3.11 | 1.40 | 97.6 |
| Example 11 | 70 | 261 | 500 | 1.92 | 2.56 | 1.50 | 97.8 |
| Example 12 | 70 | 462 | 902 | 1.95 | 1.85 | 1.65 | 96.1 |
| Example 13 | 100 | 120 | 235 | 1.96 | 3.01 | 1.40 | 96.5 |
| Example 14 | 100 | 385 | 678 | 1.76 | 2.08 | 1.50 | 96.2 |
| Example 15 | 100 | 499 | 998 | 2.00 | 1.41 | 1.65 | 92.0 |
| Example 16 | 100 | 500 | 1050 | 2.10 | 1.35 | 1.65 | 93.0 |
| Example 17 | 100 | 500 | 1000 | 2.00 | 1.35 | 1.65 | 95.0 |
| Example 18 | 100 | 500 | 1050 | 2.10 | 2.00 | 1.65 | 94.9 |
| Comparative Example 1 | 50 | 95 | 150 | 1.57 | 2.10 | 1.65 | 89.9 |
| Comparative Example 2 | 70 | 850 | 1000 | 1.18 | 2.85 | 1.50 | 79.8 |
| Comparative Example 3 | 100 | 586 | 1050 | 1.79 | 1.39 | 1.66 | 85.6 |
| Comparative Example 4 | 100 | 75 | 148 | 1.97 | 3.56 | 1.39 | 86.7 |
| Comparative Example 5 | 100 | 895 | 1000 | 1.12 | 1.56 | 1.50 | 80.1 |
| Comparative Example 6 | 105 | 499 | 998 | 2.00 | 1.41 | 1.65 | 88.5 |
| Comparative Example 7 | 105 | 499 | 1010 | 2.02 | 3.50 | 1.65 | 89.5 |
| Reference Example 1 | 40 | 130 | 150 | 1.15 | 2.10 | 1.65 | 95.3 |
| Reference Example 2 | 40 | 125 | 140 | 1.12 | 2.10 | 1.65 | 96.8 |
| Reference Example 3 | 40 | 122 | 140 | 1.15 | 2.05 | 1.65 | 95.0 |

As is clear from Reference Examples 1 to 3, a thickness of the negative electrode active material layer was 40 μm, the orientation degree of the negative electrode active material layer was small, and a change in the orientation degree caused by the inner layer or the surface layer of the negative electrode active material layer was less likely to occur. In addition, even when the orientation degree ratio of the negative electrode active material layer is small such as 1.5 or less, a reduction in the capacity retention rate did not occur.

With respect to this, as is clear from Examples 1 to 18 and Comparative Examples 1 to 7, when the thickness of the negative electrode active material layer becomes thicker such as 50 μm or more compared to the related art for the purpose of increasing the capacity of the battery capacity, the capacity retention rate was improved by preparing the orientation degree or the like of the negative electrode active material layer.

In particular, in the cases of each of Examples in which the orientation degree A in the inner layer of the negative electrode active material layer was 100 or more and 500 or less, it was found that the capacity retention rate tends to be improved. This was considered because excellent battery reactivity was obtainable while the negative electrode active material layer in the vicinity of the negative electrode collector was not significantly collapsed.

In the cases of each of Example 2, Examples 4 to 15, and Example 17 in which the orientation degree A was in the above-described range, and the orientation degree B of the entire negative electrode active material layer was in the ranges of 150 or more and 1000 or less, higher capacity retention rate was obtained. In addition, in the cases of each Examples 4 to 15 in which the pore volume ratio was in the ranges of 1.4 or more and 3.4 or less, significantly high capacity retention rate was obtained.

As described above, by appropriately adjusting the orientation degree of the negative electrode active material layer, the pore volume ratio, and the like, battery characteristics are improved.

In addition, the present disclosure may have the following configuration.

[1] A battery including: a positive electrode; a negative electrode in which a negative electrode active material layer containing a negative electrode active material containing natural graphite is formed on at least one surface of a negative electrode collector; and an electrolyte, wherein a thickness of the negative electrode active material layer per one surface of the negative electrode collector is 50 μm or more and 100 μm or less, and in the negative electrode active material layer from the negative electrode collector up to ½ of the thickness of the negative electrode active material layer in a surface direction of the negative electrode active material layer, an orientation degree A expressed as (peak intensity of carbon 002 face/peak intensity of carbon 110 face) that is a peak intensity ratio of a carbon 002 face and a carbon 110 face measured by an X-ray diffraction method is 100 or more and 500 or less.

[2] The battery according to [1], wherein in the entire negative electrode active material layer, an orientation degree B expressed as (peak intensity of carbon 002 face/peak intensity of carbon 110 face) that that is a peak intensity ratio of a carbon 002 face and a carbon 110 face measured by the X-ray diffraction method is 150 or more and 1,000 or less.

[3] The battery according to [1] or [2], wherein (orientation degree B/orientation degree A) that is a ratio of the orientation degree A and the orientation degree B is 1.5 or more and 2.0 or less.

[4] The battery according to any one of [1] to [3], wherein in the negative electrode active material layer from the negative electrode collector up to ½ of a layer thickness in the surface direction of the negative electrode active material layer, a pore volume ratio (pore volume B/pore volume A) that is a ratio of a pore volume A [ml/g] in a range of 0.001 μm or more and 0.4 μm or less of a pore diameter measured by a mercury porosimeter and a pore volume B [ml/g] in a range of 0.4 μm or more and 10 μm or less thereof is 1.4 or more and 3.4 or less.

[5] The battery according to any one of [1] to [4], wherein a volume density of the negative electrode active material layer is 1.40 $g/cm^3$ or more and 1.65 $g/cm^3$ or less.

[6] The battery according to [1], wherein a binder contained in the negative electrode active material layer is styrene-butadiene rubber.

[7] A negative electrode for a battery, wherein a negative electrode active material layer containing a negative electrode active material containing natural graphite is formed on at least one surface of a negative electrode collector, a thickness of the negative electrode active material layer per one surface of the negative electrode collector is 50 μm or more and 100 μm or less, an in the negative electrode active material layer from the negative electrode collector up to ½ of the thickness of the negative electrode active material layer in a surface direction of the negative electrode active material layer, an orientation degree A expressed as (peak intensity of carbon 002 face/peak intensity of carbon 110 face) that is a peak intensity ratio of a carbon 002 face and a carbon 110 face measured by an X-ray diffraction method is 100 or more and 500 or less.

[8] A battery pack including: the battery according to [1], a control unit that controls the battery; and an external body that contains the battery.

[9] An electronic apparatus that includes the battery according to [1], and receives supplying of power from the battery.

[10] An electric vehicle including: the battery according to [1]; a conversion apparatus that receives supplying of power from the battery to thereby convert the received power into a driving force of the vehicle; and a control device that performs an information process for vehicle control based on information about the battery.

[11] An electricity storage apparatus that includes the battery according to [1], and supplies power to an electronic apparatus connected to the battery.

[12] The electricity storage apparatus according to [11], wherein a power information control device for transmitting and receiving signals to and from another device via a network is provided, and charging and discharging control of the battery are performed based on information received by the power information control device.

[13] An electric power system that receives supplying of power from the battery according to [1], or supplies power from a power generation device or a power grid to the battery.

It should be understood that various changes and modifications to the presently preferred embodiments described herein will be apparent to those skilled in the art. Such changes and modifications can be made without departing from the spirit and scope of the present subject matter and The invention is claimed as follows:

1. A battery comprising:
   a positive electrode;
   a negative electrode including a negative electrode active material layer that is formed on at least one surface of a negative electrode collector; and
   an electrolyte,
   wherein,
   a thickness of the negative electrode active material layer per one surface of the negative electrode collector is 50 µm or more and 100 µm or less,
   in the negative electrode active material layer from the negative electrode collector up to ½ of the thickness of the negative electrode active material layer in a surface direction of the negative electrode active material layer, an orientation degree A expressed as (peak intensity of carbon 002 face/peak intensity of carbon 110 face) that is a peak intensity ratio of a carbon 002 face and a carbon 110 face measured by an X-ray diffraction method is 100 or more and 500 or less,
   in the entire negative electrode active material layer, an orientation degree B expressed as (peak intensity of carbon 002 face/peak intensity of carbon 110 face) that is the peak intensity ratio of the carbon 002 face and the carbon 110 face measured by the X-ray diffraction method is 150 or more and 1,000 or less, and
   (orientation degree B/orientation degree A) that is a ratio of the orientation degree A and the orientation degree B is 1.5 or more and 2.0 or less.

2. The battery according to claim 1, wherein a volume density of the negative electrode active material layer is 1.40 g/cm$^3$ or more and 1.65 g/cm$^3$ or less.

3. The battery according to claim 1, wherein a binder included in the negative electrode active material layer is styrene-butadiene rubber.

4. A battery pack comprising:
   the battery according to claim 1;
   a control unit configured to control the battery; and
   an external body that contains the battery.

5. An electronic apparatus that includes the battery according to claim 1, and wherein the electronic apparatus is configured to receive supply of power from the battery.

6. An electric vehicle comprising:
   the battery according to claim 1;
   a conversion apparatus configured to receive supply of power from the battery to thereby convert the received power into a driving force of the electric vehicle; and
   a control device configured to perform an information process for electric vehicle control based on information about the battery.

7. An electricity storage apparatus that includes the battery according to claim 1, wherein the battery is configured to supply power to an electronic apparatus connected to the battery.

8. The electricity storage apparatus according to claim 7, further comprising:
   a power information control device configured to transmit and receive signals to and from another device via a network,
   wherein charging and discharging control of the battery is performed based on information received by the power information control device.

9. An electric power system configured to receive supply of power from the battery according to claim 1, or supply power from a power generation device or a power grid to the battery.

10. The battery according to claim 1, wherein the negative electrode active material layer includes a carbon material.

11. The battery according to claim 10, wherein the carbon material includes graphite.

12. The battery according to claim 1, wherein the negative electrode active material layer includes at least one of Si, Sn or lithium titanate.

13. The battery according to claim 1, wherein the negative electrode active material layer includes polyvinylidene fluoride.

14. The battery according to claim 1, wherein the negative electrode active material layer includes carboxymethylcellulose.

15. The battery according to claim 1, wherein the positive electrode includes at least one of a lithium complex phosphate having a structure of an olivine type or a lithium complex oxide having a structure of a spinel type.

16. The battery according to claim 1, wherein the electrolyte includes at least one of fluoro ethylene carbonate or difluoro ethylene carbonate.

17. A negative electrode for a battery, comprising a negative electrode active material layer including a negative electrode active material,
   wherein,
   a thickness of the negative electrode active material layer per one surface of a negative electrode collector is 50 µm or more and 100 µm or less,
   in the negative electrode active material layer from the negative electrode collector up to ½ of the thickness of the negative electrode active material layer in a surface direction of the negative electrode active material layer, an orientation degree A expressed as (peak intensity of carbon 002 face/peak intensity of carbon 110 face) that is a peak intensity ratio of a carbon 002 face and a carbon 110 face measured by an X-ray diffraction method is 100 or more and 500 or less,
   in the entire negative electrode active material layer, an orientation degree B expressed as (peak intensity of carbon 002 face/peak intensity of carbon 110 face) that is the peak intensity ratio of a carbon 002 face and the carbon 110 face measured by the X-ray diffraction method is 150 or more and 1,000 or less, and
   (orientation degree B/orientation degree A) that is a ratio of the orientation degree A and the orientation degree B is 1.5 or more and 2.0 or less.

* * * * *